US008248740B2

(12) United States Patent
Birnbach

(10) Patent No.: US 8,248,740 B2
(45) Date of Patent: Aug. 21, 2012

(54) HIGH SPEED CURRENT SHUNT

(75) Inventor: Curtis A. Birnbach, New Rochelle, NY (US)

(73) Assignee: Advanced Fusion Systems, LLC, White Plains, NY (US)

( * ) Notice: Subject to any disclaimer, the term of this patent is extended or adjusted under 35 U.S.C. 154(b) by 239 days.

(21) Appl. No.: 12/554,818

(22) Filed: Sep. 4, 2009

(65) Prior Publication Data

US 2010/0097734 A1    Apr. 22, 2010

Related U.S. Application Data

(60) Provisional application No. 61/192,591, filed on Sep. 19, 2008.

(51) Int. Cl.
*H02H 9/00* (2006.01)
*H02H 1/04* (2006.01)
*H02H 3/22* (2006.01)

(52) U.S. Cl. .......................... 361/54; 361/117; 361/118

(58) Field of Classification Search .................. 361/54, 361/117, 118
See application file for complete search history.

(56) References Cited

U.S. PATENT DOCUMENTS

| | | | | |
|---|---|---|---|---|
| 4,546,358 A | * | 10/1985 | Edlin et al. | 343/703 |
| 4,554,608 A | * | 11/1985 | Block | 361/119 |
| 4,809,011 A | * | 2/1989 | Kunz | 343/754 |
| 4,950,962 A | | 8/1990 | Birnbach et al. | |
| 6,061,223 A | * | 5/2000 | Jones et al. | 361/119 |
| 6,456,478 B1 | | 9/2002 | Kuhne | |
| 6,636,407 B1 | * | 10/2003 | Ryman | 361/119 |
| 7,576,965 B2 | * | 8/2009 | Terada et al. | 361/118 |
| 7,612,733 B2 | * | 11/2009 | Weiss et al. | 343/860 |
| 2002/0079906 A1 | | 6/2002 | Rashkes | |
| 2007/0086131 A1 | | 4/2007 | Miller | |
| 2008/0038871 A1 | | 2/2008 | Chiu | |
| 2008/0042686 A1 | | 2/2008 | Otsuka | |

OTHER PUBLICATIONS

Foster et al, Report of the Commission to Assess the Threat to the United States from Electromagnetic Pulse (EMP) Attack, Critical National Infrastructures, Apr. 2008, pp.ii-181.
Carroll et al, Harmonic Effects of Solar Geomagnetically Induced Currents on the Electrical Distribution System in Nuclear Power Plants, BNL-NUREG-48242, Dec. 1992.
Pulkkinen, A, Geomagnetic Induction During Highly Disturbed Space Weather Conditions: Studies of Ground Effects, Finnish Meteorological Institute Contributions, Jun. 2003 No. 42.

(Continued)

*Primary Examiner* — Rexford Barnie
*Assistant Examiner* — Scott Bauer
(74) *Attorney, Agent, or Firm* — Charles E. Bruzga; Bruzga & Associates

(57) ABSTRACT

One form of the invention provides a method and apparatus for preventing an extraordinary electromagnetic pulse from reaching and rendering inoperative an electrical component of an electrical power system, wherein the component is located in a conductive path of the system that receives the pulse. The method and apparatus comprises the steps or means for detecting the presence of the pulse in the conductive path prior to the pulse reaching and rendering inoperative the electrical component. The pulse is diverted around the electrical component with a low inductance, high current capacity circuit relative to the electrical component before the pulse can reach and render the electrical component inoperative. The foregoing invention may beneficially utilize a high-speed current shunt comprising a flat conductive metal strap having a defined current-measuring region, a tapered parallel-plate transmission-line matching transformer attached to the current-measuring region and an output via a coaxial cable.

8 Claims, 22 Drawing Sheets

OTHER PUBLICATIONS

Wikipedia contributors, 'Varistor', Wikipedia, The Free Encyclopedia, Accessed on Nov. 4, 2009, <http://en.wikipedia.org/wiki/Varistor>. Admitted as Prior Art.

Transtector, homepage, Accessed on Nov. 4, 2009, <http://transtector.com/Products?class=acpr>.

Citel, Surge Protection General Catalog, 8th Edition, <http://www.georingled.com/citel.pdf>, pp. 32, 115. Admitted as Prior Art.

Kaiser, Kenneth L., Electromagnetic Compatibility Handbook, pp. 5-8, 5-9, Chapter 5.5, Table 5.2, 2005, CRC Press, U.S.

Torres, Horacio et al., Design, Construction and Calibration of Three Devices to Measure Directly Lightning Parameters, National Univ. of Colombia, 1999, IEEE, London, U.K.

\* cited by examiner

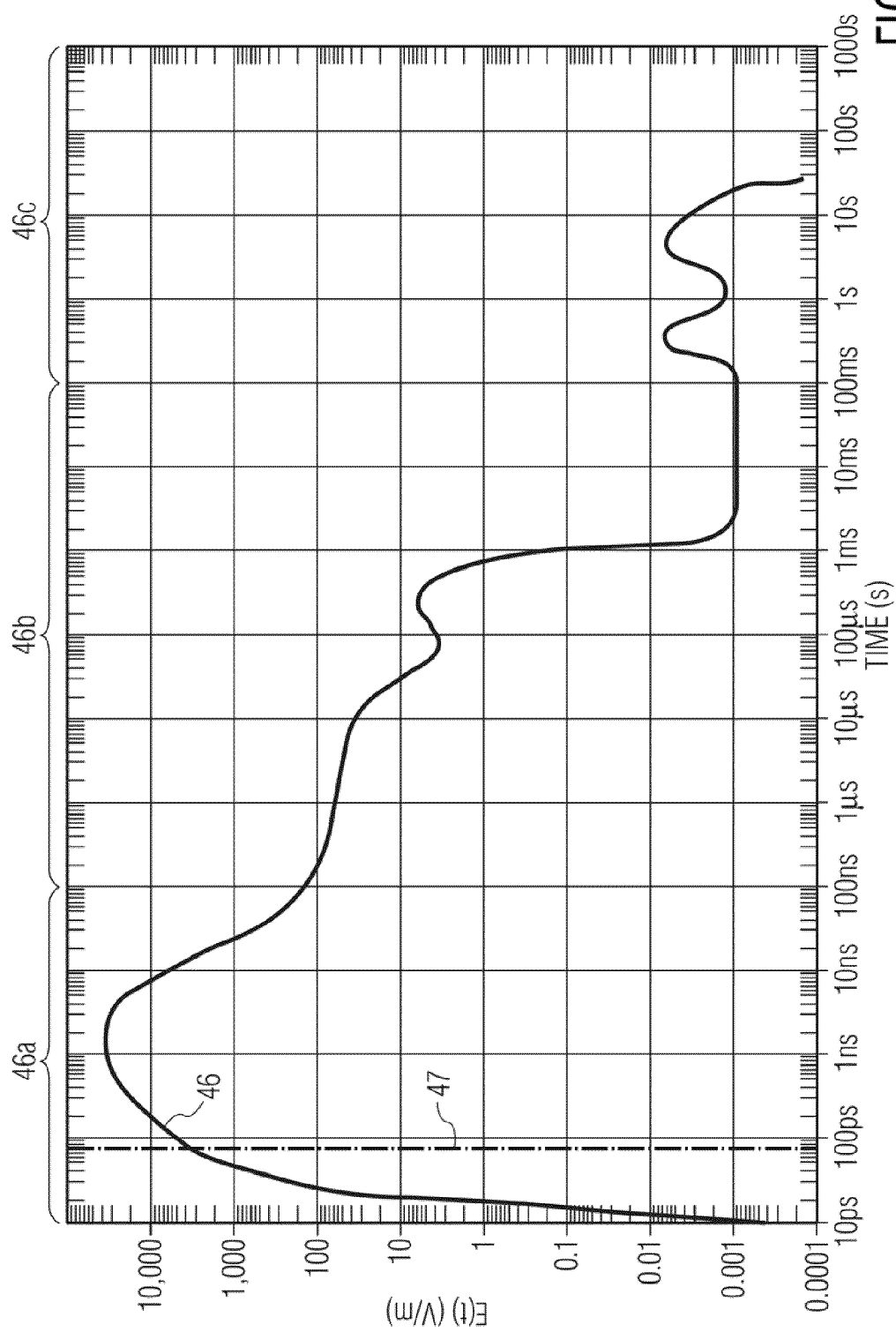

HIGH SPEED CURRENT SHUNT

CROSS-REFERENCE TO RELATED APPLICATIONS

This application claims priority from U.S. Provisional Patent Application No. 61/192,591 filed on Sep. 19, 2008 for Method and Apparatus for Electromagnetic Pulse Protection by Curtis A. Birnbach.

FIELD OF THE INVENTION

The present invention relates to a method and apparatus for preventing extraordinary electromagnetic pulses (EEMP) arising, for instance, from a nuclear explosion or solar storm, from reaching and rendering inoperative electrical components of an electrical power generation and distribution system. More particularly, an extraordinary electromagnetic pulse (EEMP) is defined as a transient pulse arising from nuclear explosions (NEMP), non-nuclear electromagnetic pulses (NNEMP) of sufficient strength to reach and render inoperative components of an electrical power system, collectively referred to as EMP, or geomagnetically-induced current (GIC) as a result of coronal mass ejections from solar storms. A further aspect of the invention relates to a high speed current shunt which may be used for detection of GIC pulses.

BACKGROUND OF THE INVENTION

The vital nature of electrical power systems to modern society is well recognized. For instance, the Report of the Commission to Assess the Threat to the United States from Electromagnetic Pulse (EMP) Attack, Critical National Infrastructures, US Government Printing Office, April 2008, states at page 17:

> The functioning of society and the economy is critically dependent upon the availability of electricity. Essentially every aspect of American society requires electrical power to function. Contemporary U.S. society is not structured, nor does it have the means, to provide for the needs of nearly 300 million Americans without electricity. Continued electrical supply is necessary for sustaining water supplies, production and distribution of food, fuel, communications, and everything else that is a part of our economy. Continuous, reliable electrical supply within very tight frequency boundaries is a critical element to the continued existence and growth of the United States and most developed countries.

The foregoing Commission Report further discusses the threat of attack to electrical power systems by an electromagnetic pulse arising from a nuclear explosion, and also refers to the naturally occurring threats to electrical power systems from geomagnetic storms. Commission Report at page 18. As used herein, electrical power systems connotes systems for generating electrical power, transmitting that power over short to long distances and distributing that power to end users.

Based on published empirical data, it is generally accepted that an EMP event can render various components of an electrical power system inoperative. Two such electrical components, electrical generators for producing electricity and electrical transformers for stepping up or stepping down voltage levels as required for power transmission or distribution, are obviously vital. If generators or transformers cease to operate, the power system fails and society as we know it ends. Both components require a long lead time to build (e.g., 3-5 years for transformers and up to 10 years for generators) if the demand from them is normal; that is, if failures occur after expected product lifetimes. However, if the demand for generators and transformers surge due to their premature failure resulting from an EMP event, the lead time to build them increases even further and likely dramatically.

It would therefore be desirable to provide a method for preventing various forms of EMP from reaching and rendering inoperative components of a power supply system. The various forms of EMP include an unwanted transient electromagnetic pulse arising from nuclear electromagnetic pulse events (NEMP), non-nuclear electromagnetic pulse (NNEMP) events creating a pulse with a rise time of less than 500 picoseconds and a field strength (e.g., in excess of 20 volts per meter) sufficient to reach and render inoperative components of an electrical power supply system as defined above, or geomagnetically-induced currents (GIC) arising from coronal mass ejections of solar storms or other EMP events. These EMP's are classified herein as extraordinary electromagnetic pulses (EEMP's).

Another problem in the prior art relates to how to accurately measure high-speed current pulses, such as GIC. Prior art techniques for high speed current-pulse measurements are almost exclusively inferential. The U.S. National Institute of Standard and Technologies (NIST) prefers direct measurements wherever possible rather than inferential measurements. The numerical calculations associated with inferential measurement techniques increase the likelihood of errors in correcting raw data to Inferentially arrive at an actual measurement. This is because the numerical calculations required are complex, there is an impetus to simplify the calculations, a process which almost always leads to the introduction of errors.

There are three overriding reasons for having a high-accuracy high-speed current shunt, as follows:
  1. Provide real-time monitoring means to guide the manufacture of devices to protect electrical components of a power system from EEMP events.
  2. Provide high speed output for control circuitry.
  3. Provide high speed output for system operator notification of an EEMP event.

Therefore, it would be desirable to provide a direct technique for measurement of high-speed current pulses.

SUMMARY OF THE INVENTION

One form of the invention provides a method and apparatus for preventing an extraordinary electromagnetic pulse from reaching and rendering inoperative an electrical component of an electrical power system, wherein the component is located in a conductive path of the system that receives the pulse. The method and apparatus comprises the steps or means for detecting the presence of the pulse in the conductive path prior to the pulse reaching and rendering inoperative the electrical component. The pulse is diverted around the electrical component with a low inductance, high current capacity circuit relative to the electrical component before the pulse can reach and render the electrical component inoperative.

The foregoing method and apparatus prevents various forms of EEMP from reaching and rendering inoperative components of a power supply system.

Another aspect of the invention provides a high-speed current shunt comprising a flat conductive metal strap having a defined current-measuring region, a tapered parallel-plate transmission-line matching transformer attached to the current-measuring region and an output via a coaxial cable.

The foregoing current shunt beneficially provides a direct technique for measurement of high-speed current pulses, and may be used in the first-mentioned Invention.

BRIEF DESCRIPTION OF THE DRAWINGS

In the drawings, in which like reference numerals refer to like parts:

FIG. 2E shows a voltage-versus-time waveform for a nuclear electromagnetic pulse (NEMP) in relation to a desired risetime for a switch used to divert the NEMP away from a electrical component of a power supply system.

DETAILED DESCRIPTION OF THE DRAWINGS

Figure 1A:
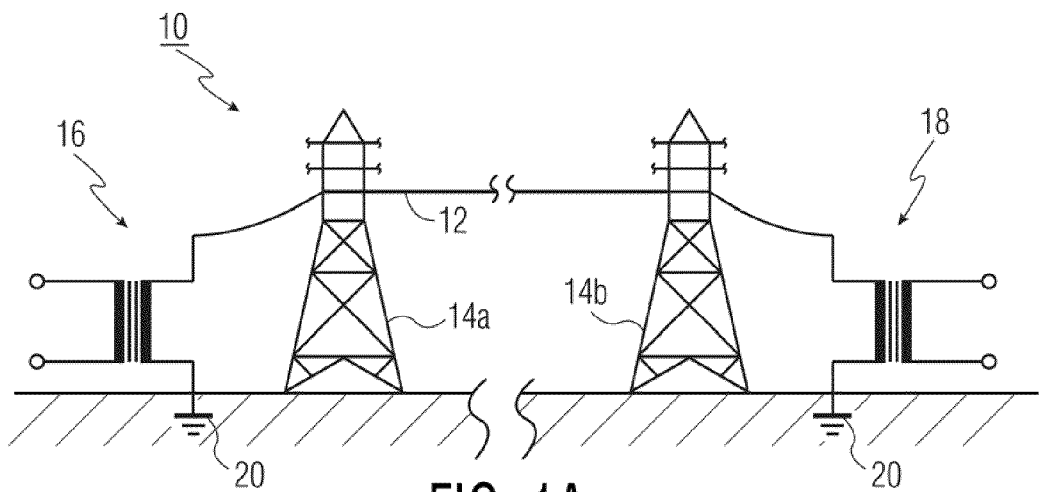
FIG. 1A shows a schematic diagram of part of an AC electrical power transmission grid.
Figure 1B:
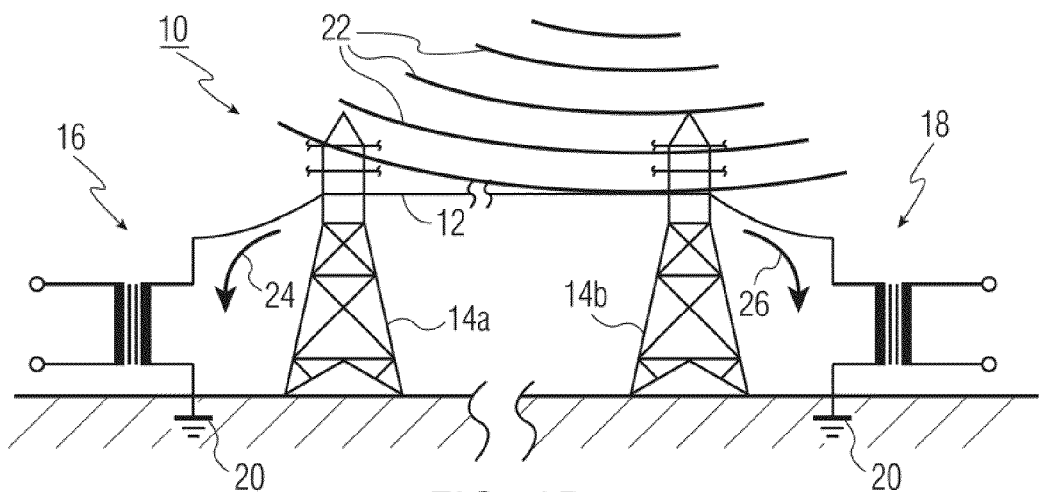
FIG. 1B shows the grid of FIG. 1A receiving a nuclear or non-nuclear electromagnetic pulse.
Figure 1C:
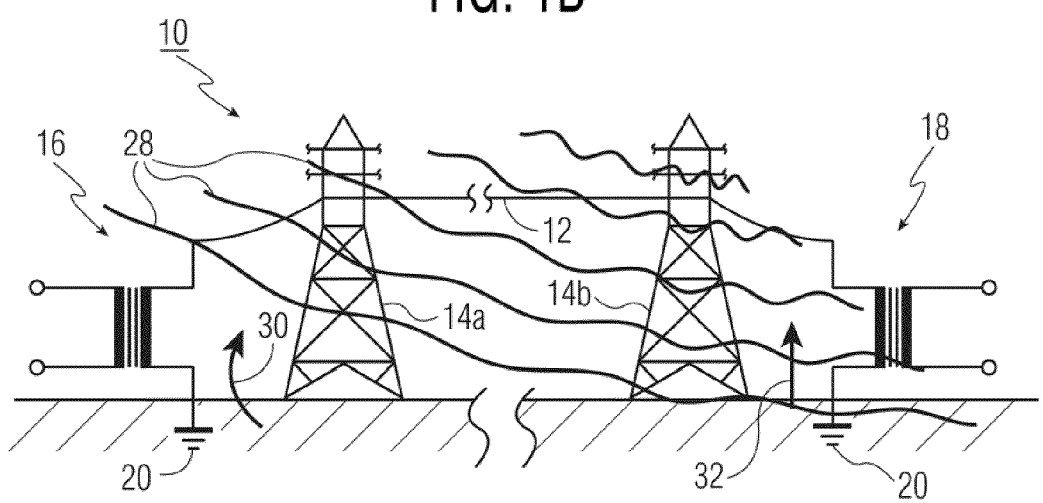
FIG. 1C shows the grid of FIG. 1A receiving a geomagnetically-induced current pulse.

FIGS. 1A-1C show a typical portion of an electrical power transmission grid and illustrate different types of extraordinary electromagnetic pulses (EEMP's) that may be received by the grid.

FIG. 1A shows a portion of an AC electrical power transmission grid 10 that may be protected from an EEMP in accordance with the present invention. Grid 10 includes a power transmission line 12, suspended from transmission towers 14a and 14b, and may typically be much longer than as illustrated. Electrical transformers 16 and 18 are respectively situated at the two ends of power transmission line 12. Each transformer may comprise one phase of a 3-phase wye-connected transformer, by way of example. A lower-shown electrode of each transformer 16 and 18 is shown connected to a respective earth ground 20. As is typical, each earth ground may comprise an electrical conductor buried in the ground to assure a more robust connection to earth ground. In order to assure a more robust ground for purposes of increasing the effectiveness of the present invention, it may be desirable to inject a conductive agent into the ground, such as a supersaturated solution of Copper Sulphate.

FIG. 1B shows grid 10 of FIG. 1, with transmission line 12 receiving an EEMP 22 of the nuclear electromagnetic pulse (NEMP) or non-nuclear electromagnetic pulse (NNEMP) variety. Pulse 22 is shown with associated arrows indicating direction of movement of the pulse. After being received by transmission line 12, NEMP or NNEMP 22 can follow either of two conductive paths 24 or 26 that respectively include transformers 16 and 18 and earth ground 20. NEMP or NNEMP 22 may typically induce current in conductive paths 24 or 26 far in excess of the current-handling capability of transformers 16 and 18, and would thereby render inoperative the transformers unless NEMP or NNEMP 22 is diverted away from them.

FIG. 1C shows grid 10 of FIG. 1, with transmission line 12 receiving an EEMP of the geomagnetically-induced current (GIC) variety. Such pulse is shown at 28, with associated arrows showing direction of movement of the pulse. After being received on transmission line 12, GIC pulse 28 can follow either of two conductive paths 30 or 32 that respectively include earth ground and transformers 16 and 18. GIC pulse 28 may typically induce current in conductive paths 30 or 32 far in excess of the current-handling capability of transformers 16 and 18, and would thereby render inoperative the transformers unless GIC pulse 28 is diverted away from them.

Figure 2A:
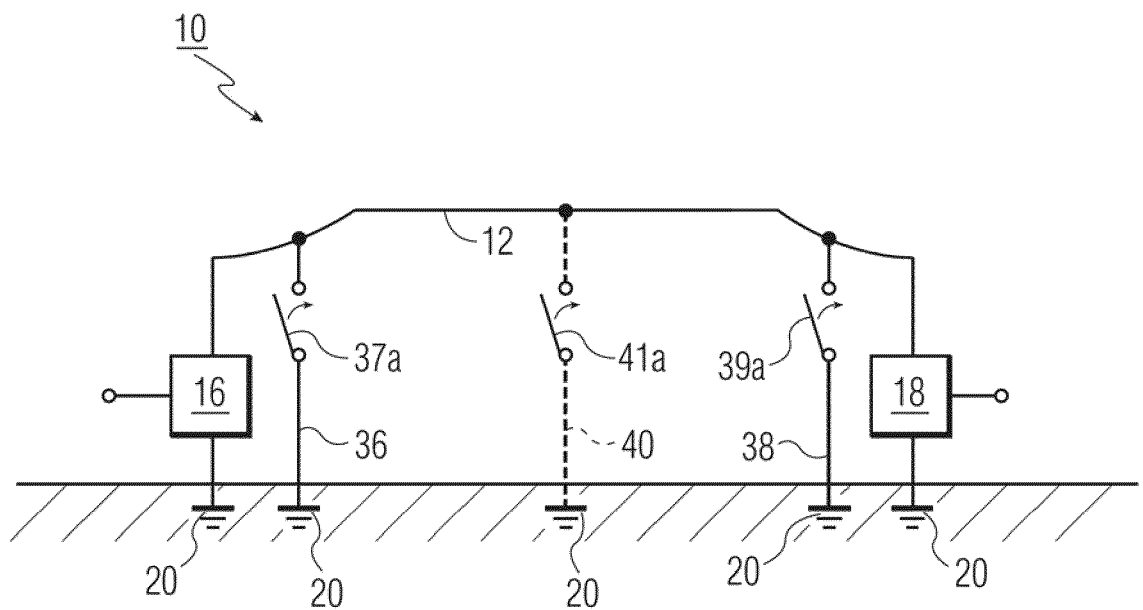
FIG. 2A shows a simplified version of FIG. 1, partially in block form, together with a pair of current-diverting paths for diverting EMP's away from transformers an optional current-diverting path for diverting EMP's away from a transmission line to earth ground.

FIG. 2A shows a simplified version of FIG. 1 with various current-diverting paths 36, 38 and 40. Current-diverting paths 36 and 38 respectfully divert current away from transformers 16 and 18. Optional current-diverting path 40 diverts current from a portion of transmission line 12, receptive of an EEMP, to prevent such portion of line 12 from being rendered inoperative by the EEMP. Each of paths 36, 38 and 40 constitutes a low-inductance, high current capacity circuit relative to the respective, associated electrical components of grid 10, and is shown diagrammatically as a switch 37a, 39a or 41a. As such, an EEMP can be diverted from transformers 16 and 18 and from a portion of transmission line 12, receptive of an EEMP, before the EEMP can render such electrical components of the grid inoperative.

Figure 2B:
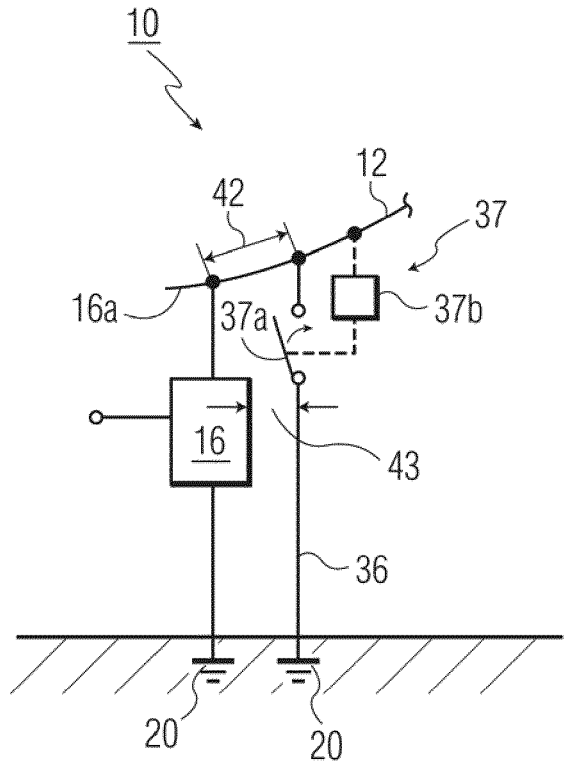
FIG. 2B shows a fragment of the circuit of FIG. 2A.

FIG. 2B shows current-diverting path 36 of FIG. 2A in more detail. Current-diverting path 36 includes a protective device 37 consisting of a switch 37a and a switch controller 37b whose details are described below. It is desired for length 42, between an upper node 16a of transformer 16 and path 36, to be as short as is physically possible, so that the distance 43 between transformer 16 and current-diverting path 36 can be minimized. This is important to keep the risetime of the current-diverting path 36 fast enough to ensure the diversion circuit path is completed before the damaging pulse reaches the protected component. It may also be desirable to provide a vacuum capacitor (not shown) in parallel with current-diverting path 36, for suppressing ordinary EMP's, such as minor transients. This is true for the other current-diverting paths described herein.

Figure 2C:
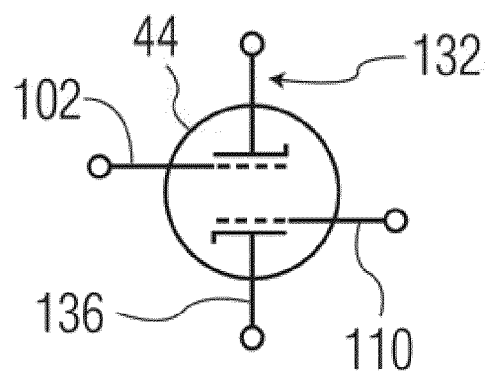
FIGS. 2C and 2D show schematic diagrams of alternative implementations of a switch in a current-diverting path shown in FIG. 2B.
Figure 2D:
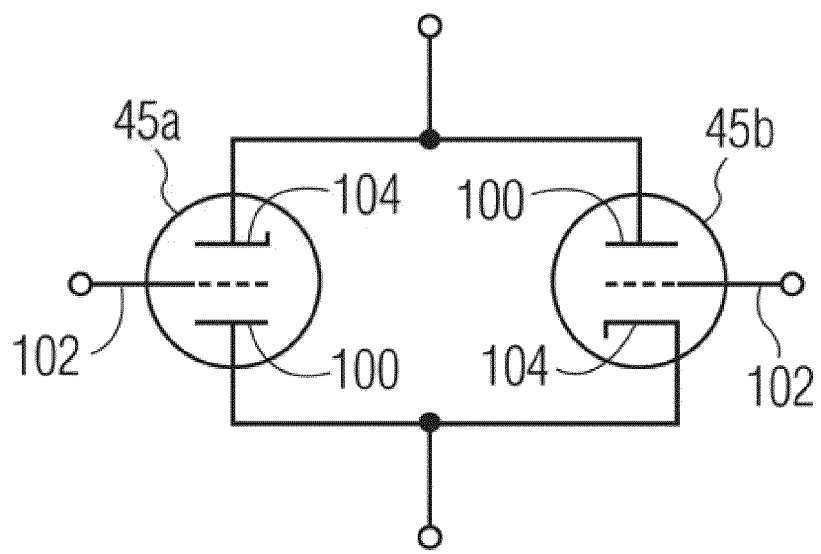

As shown in FIG. 2C, switch 37a may be embodied as a bidirectional high-voltage cold-cathode field-emission bi-directional electron tube known as a Bi-tron 44. The name "Bi-tron" has been coined by the current inventor, and its construction is described below. Alternatively, as shown in FIG. 2D, switch 37a may be embodied as a pair of back-to-back connected high-voltage cold-cathode field emissions triodes. The bi-directionality of switch 37a (FIG. 2B) allows the switch to turn on no matter what the polarity of the line voltage on transmission line 12 is relative to earth ground 20. This prevents a delay in turning on switch 37a of up to ½ cycle for AC line voltage on transmission line 12. Bi-directionality of switch 37a is also desirable so that the switch conducts an EEMP that passes downwardly through transformer 16 (or other protected electrical component) as in FIG. 1B, or an EEMP that passes upwardly through transformer 16 (or other electrical component) as in FIG. 1C.

In FIG. 2C, the electrodes of Bi-tron 44 comprise first and second cathanodes 132 and 136, and first and second grids 102 and 110. In FIG. 2D, the electrodes for each of high-voltage cold-cathode field emissions triodes 45a and 45b comprise an anode 100, a grid 102 and a cathode 104.

When protecting against NEMP, NNEMP and GIC, either the Bi-tron of FIG. 2C or the back-to-back high-voltage cold-cathode field emission triodes of FIG. 2D are equally applicable to DC transmission lines as it is to AC transmission lines. This is due to the difference in current flow directions of EMP versus GIC pulses, as illustrated in FIGS. 1B and 1C, which requires bidirectional switching means. Both switches preferably have risetimes of less than 100 picoseconds, so as to protect against NEMP's and NNEMP's. Switches with significantly slower risetimes will not be effective in suppressing NEMP's and NNEMP's. Slower risetimes increase the likelihood of sustaining damage to the protected electrical components.

Figure 2F:
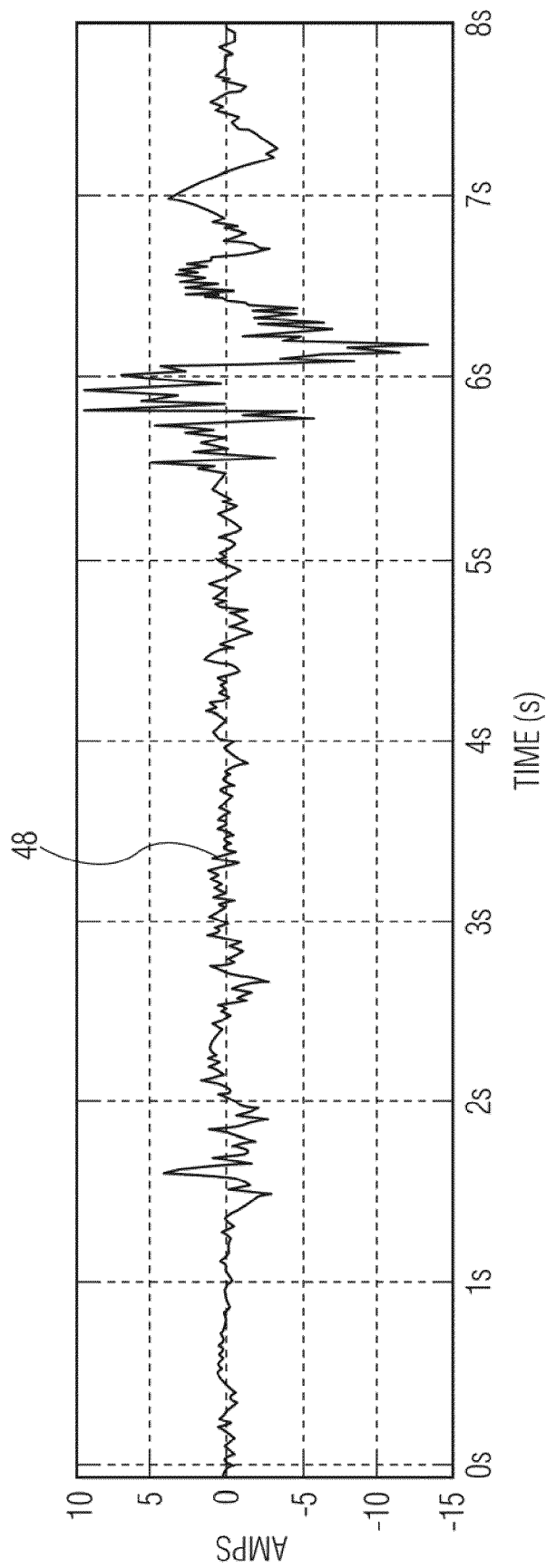
FIG. 2F shows a current-versus-time waveform for an extraordinary electromagnetic pulse (EEMP) arising from geomagnetically-induced current (GIC).

In FIGS. 2A and 2B, an appropriate switch 37a for current-diverting path 36 has several design requirements: it must turn on before an EEMP can render inoperative the protected electrical components, i.e., transformers 16 and 18 in FIG. 2A, and it also must handle the high currents typical of EEMP's. FIGS. 2E and 2F respectively show typical waveforms for a nuclear electromagnetic pulse (NEMP) and an EEMP arising from geomagnetically-induced current. These figures are presented for considering the requirements of switches 37a and 39a and similar switches described herein for diverting EEMP's around electrical components to be protected from such pulses.

FIG. 2E shows a NEMP 46 and further shows sequential stages 46a, 46b and 46c of such NEMP. During stage 46a, for example, an NEMP 46 rises to well above 20 volts per meter in field strength in less than 100 picoseconds. Pulses of this fast a risetime and with amplitudes equal to or greater than 20 volts per meter, whether NEMP or NNEMP, should be protected against. It is necessary to use a switching means with a risetime faster than 100 Picoseconds to prevent an electrical component from becoming inoperative due to NEMP 46 or an NNEMP (not shown). An acceptable risetime 47 is about 80 picoseconds. Risetimes significantly longer than 100 picoseconds are likely to allow damage to components sought to be protected. The likelihood increases as the risetime increases.

The NEMP waveform 46 shown in FIG. 2E is a representative member of the class of waveforms commonly known as EMP, and more specifically as NEMP and NNEMP. These waveforms are each unique, but collectively share important common characteristics such as fast risetime. It is important to recognize that NEMP and NNEMP share common characteristics (e.g., risetime) and, from the point of view of the current invention and the protected electrical components, are indistinguishable.

FIG. 2F shows a current-versus-time waveform for an EEMP 48 arising from a GIC pulse, and is an actual recording of a GIC that occurred Jan. 13, 1999 in Finland. From FIG. 2F, it can be seen that either waveform is capable of inducing potentially damaging transients in an electrical power system.

Figure 3:
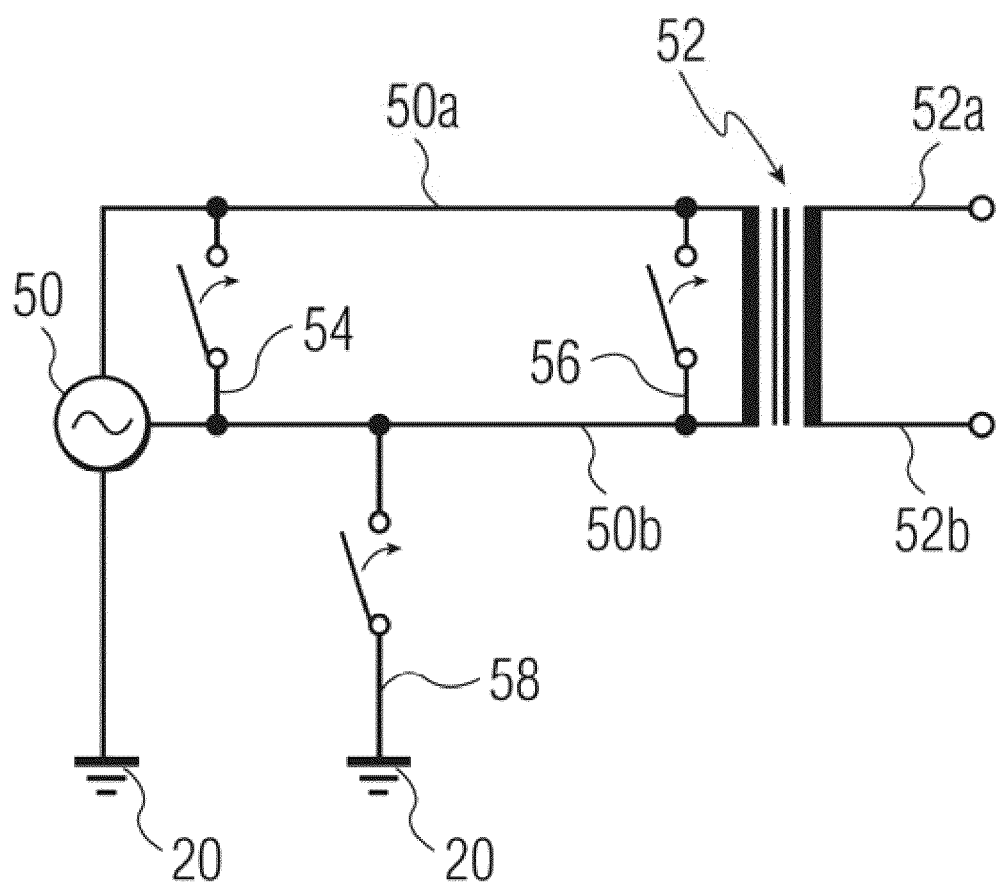
FIG. 3 is a schematic diagram of another portion of an electrical power transmission grid utilizing current-diverting paths in accordance with an aspect of the invention.

FIG. 3 illustrates protected electrical components having inputs or outputs floating with respect to earth ground as is found in delta-connected 3-phase circuits, for example. Thus, FIG. 3 shows an electrical generator 50 with a AC output appearing on output lines 50a and 50b, and a transformer 52 having its left-shown winding connected to lines 50a and 50b and having its output winding connected to output lines 52a and 52b. Lines 50a, 50b, 52a and 52b are all floating with respect to earth ground 20. Transformer 52 may comprise one phase of a 3-phase delta-connected winding, by way of example.

In FIG. 3, current-diverting path 54 protects generator 50, while current-diverting path 56 protects the left-shown primary winding of transformer 52. Optionally, current-diverting path 58 can provide a path for dissipation of current in line 50b through earth ground 20. The mentioned current-diverting paths conform to the above description of current-diverting paths, such as path 36 in FIG. 2B. Path 58 is especially desirable as it allows the circulating energy created by the two current-diverting paths to dissipate to ground.

Figure 4A:
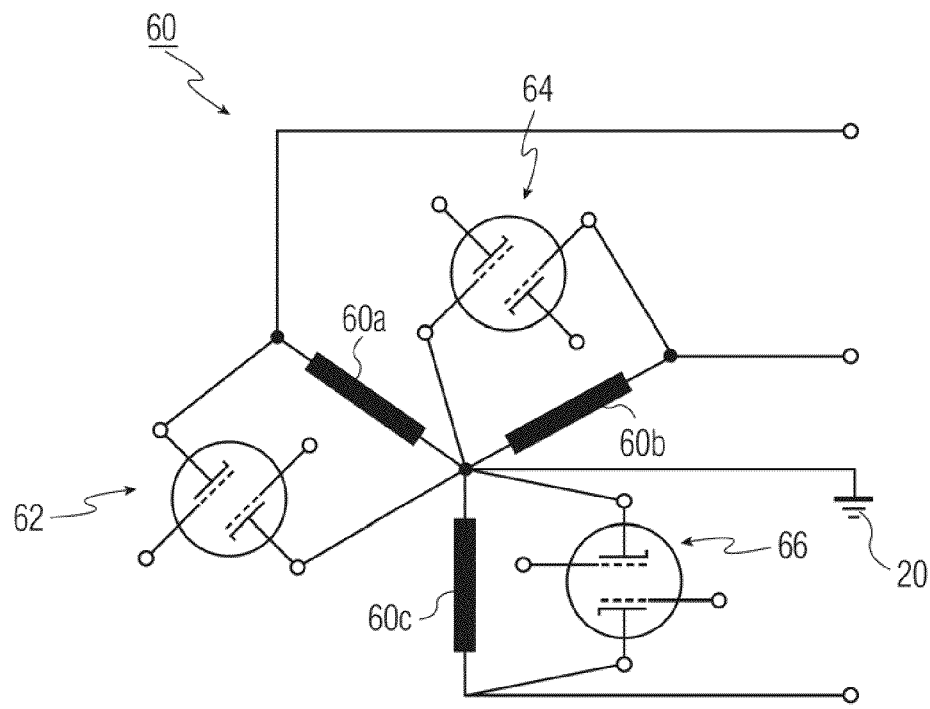
FIGS. 4A and 4B respectively show schematic diagrams of wye-connected windings and delta-connected windings with associated current-diverting paths in accordance with an aspect of the invention.

FIG. 4A shows one side 60 of wye-connected transformer windings 60a, 60b and 60c. Each winding 60a, 60b and 60c is shunted by an associated current-diverting path 62, 64 or 66, in accordance with an aspect of the invention. Paths 62, 64 and 66 are each shown in simplified form as a bi-directional switch of Bi-tron configuration, although control circuitry described below would be used to operate the Bi-tron switches. In this wye-connected side 60 of a transformer, one end of each of the windings and associated current-diverting paths is connected to earth ground 20.

Figure 4B:
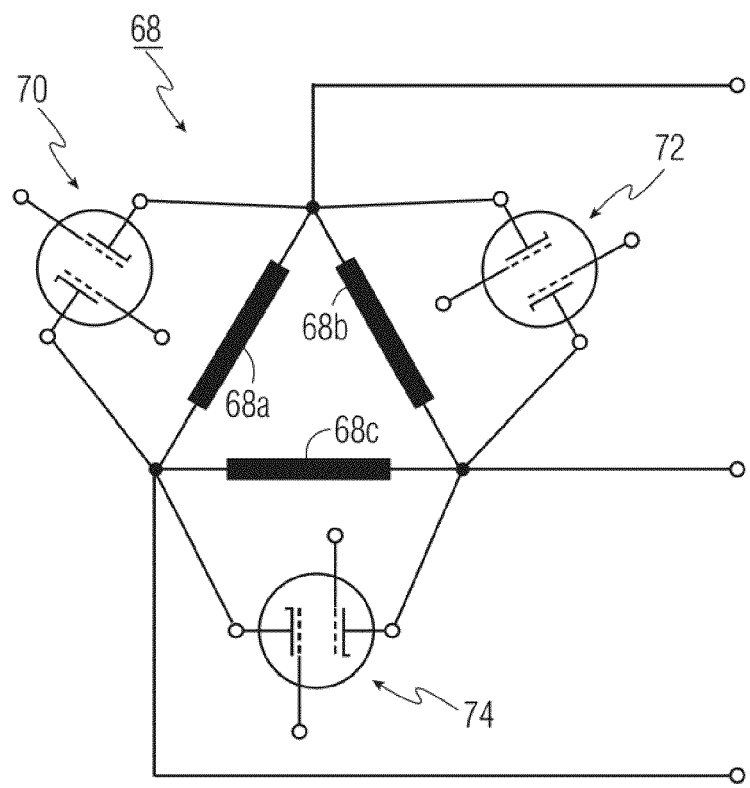

FIG. 4B shows one side 68 of delta-connected transformer windings 68a, 68b and 68c. Each winding 68a, 68b and 68c is shunted by an associated current-diverting path 70, 72 or 74 in accordance with an aspect of the invention. Paths 70, 72 and 74 are each shown in simplified form as a bi-directional switch of Bi-tron configuration, although control circuitry described below would be used to operate the Bi-tron switches. In this delta-connected side 68 of a transformer, neither end of the windings or of their associated current-diverting paths is connected to earth ground (not shown).

Figure 5A:
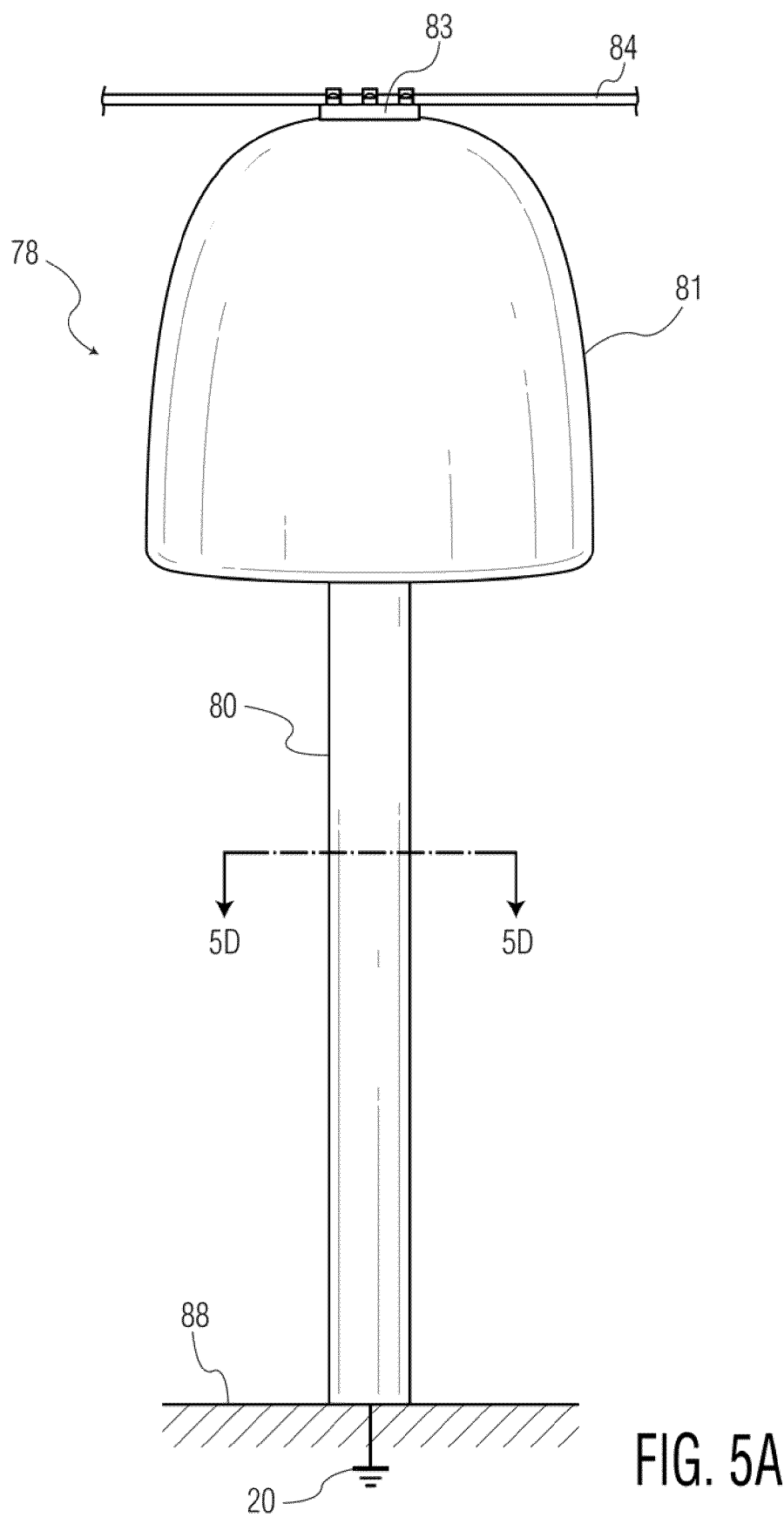
FIG. 5A is a front plan view of a current-diverting path with a self-supporting grounded electrode in accordance with an aspect of the invention.
Figure 5B:
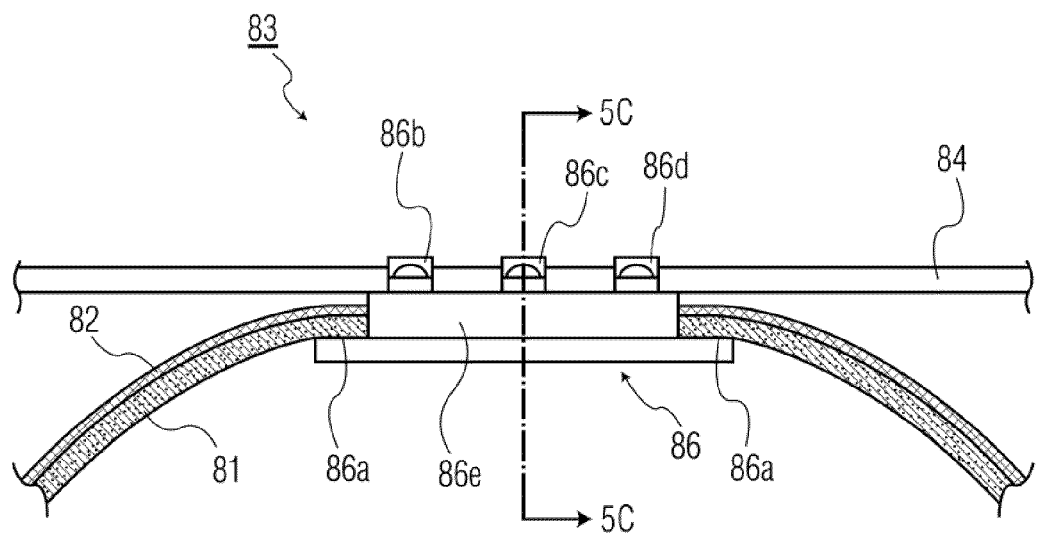
FIG. 5B shows a partial cross-sectional view of an electrically and horizontally supporting connection device and associated structure of FIG. 5A.

FIGS. 5A and 5B illustrate a current-diverting path 78 that may be used in the case of wye-connected windings, as for instance, to implement in FIG. 4A current-diverting path 62, 64 or 66. As with paths 62, 64 and 66, current-diverting path 78 of FIG. 5A is connected to earth ground 20.

In FIG. 5A, current-diverting path 78 includes an electrically-insulated and vertically-supporting ground conductor 80, a vacuum housing 81, and an electrical and horizontally-supporting connection device 83 to a conductor 84 of an electrical power transmission grid. As further detailed below, vacuum housing 81 preferably contains a switch, such as shown schematically in FIG. 2B at 37a, together with circuitry for detecting EEMP's. Insulated ground conductor 80 is preferably vertically self-supporting, with its lower end mechanically affixed to a mechanical support 88, shown diagrammatically.

Figure 5C:
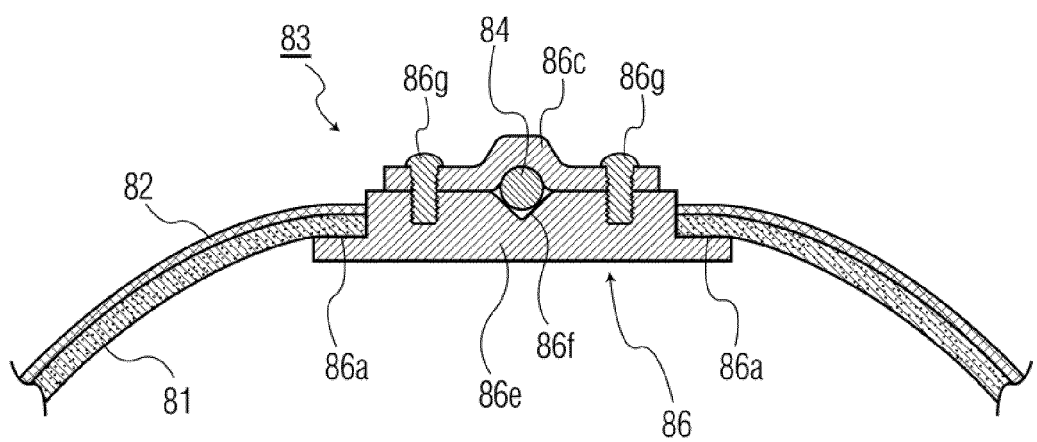
FIG. 5C shows a partial cross-sectional view of the electrically and horizontally supporting connection device and associated structure of FIG. 5B taken at arrows 5C, 5C in FIG. 5B.

FIGS. 5B and 5C show more details of a preferred construction of electrical and horizontally-supporting connection device 83 of FIG. 5A, which minimizes the conductive path length from conductor 84 to EEMP detection circuitry within vacuum housing 81. This, in turn, decreases the risetime of the switch within housing 81.

Housing 81 preferably comprises dielectric material that is optionally covered with a KEVLAR® or similar aramid-fiber jacket 82 to make housing 81 more resistant to environmental hazards, such as sandstorms or being shot with a bullet. The connection to the power conductor 84 is made by a metal connector assembly 86, with metal connecting part 86e vacuum sealed to housing 81 at locations 86a, for instance. Metal connector assembly 86 includes clamps 86b, 86c and 86d for clamping onto conductor 84, which fits within a generally V-shaped groove 86f, wherein any sharp edges have been removed. Clamps 86b, 86c and 86d may be held onto metal connecting part 86e with appropriate screws 86g, for instance.

Figure 5D:
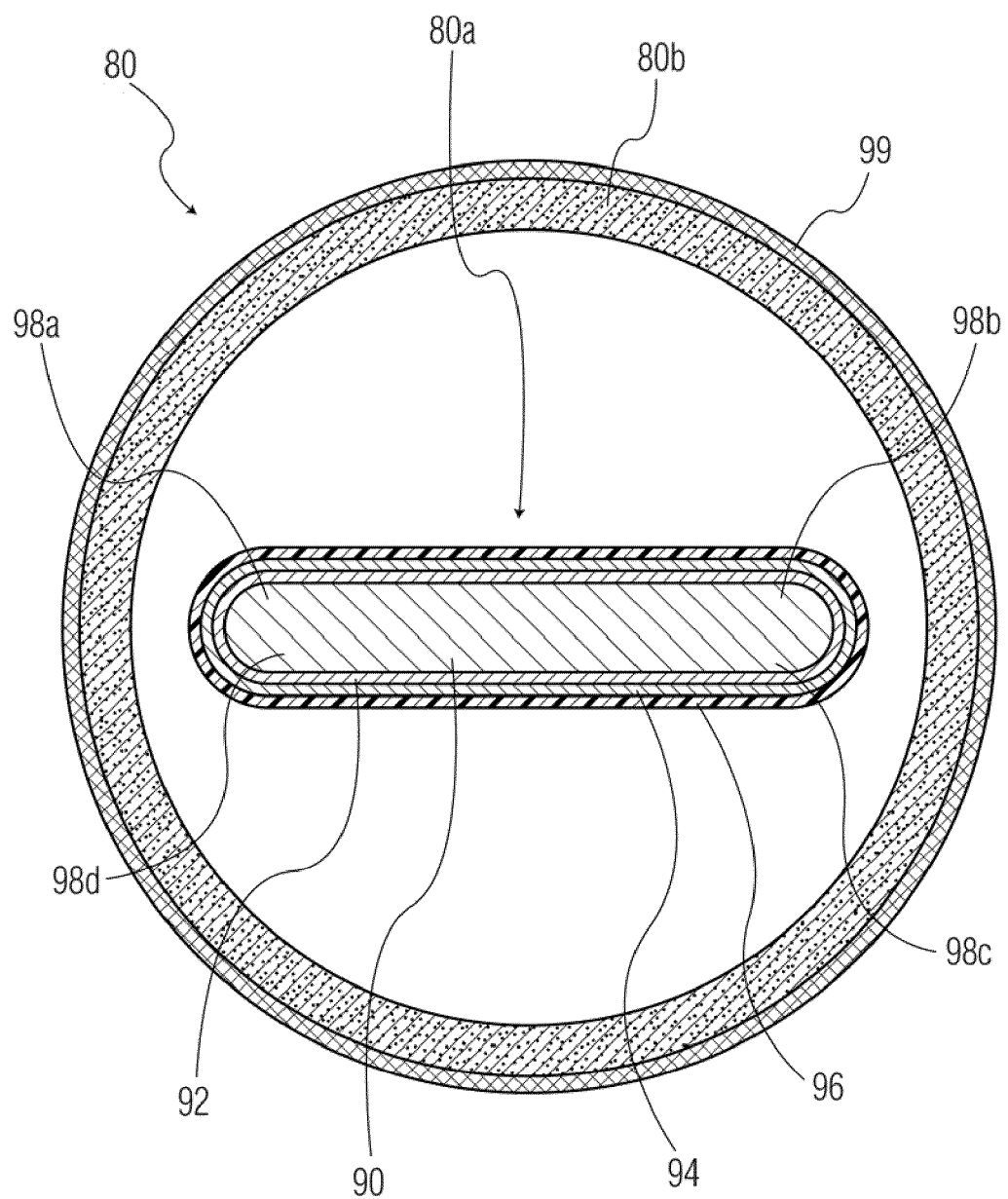
FIG. 5D shows a cross-sectional view taken at arrows 5D, 5D in FIG. 5A.

FIG. 5D is a cross-sectional view of insulated ground conductor 80 taken at arrows 5D, 5D in FIG. 5A. Insulated ground conductor 80 has an inner part 80a and outer part 80b. Inner part 80a preferably comprises an elongated, conductive stainless steel core 90, encircled by a conformal conductive chrome sheathing layer 92, which in turn is covered by a conformal conductive copper sheathing layer 94. Sheathings 92 and 94 are preferably applied by the plasma-spray process. Alternatively, sheathings 92 and 94 could be applied as thick electroplated layers. Preferably, a corrosion-resistant dielectric protective layer 96 covers copper sheathing layer 94. Protective layer 96 is preferably applied by electrostatic powder coating. A KEVLAR® or similar aramid-fiber jacket 99 preferably encases outer part 80b to provide resistance against environmental hazards, such as sandstorms or being shot with a bullet.

In order to handle high currents when conducting EEMP's, chrome sheathing layer 92 should intimately conform to stainless steel core 90, and copper sheathing layer 94 should intimately conform to chrome sheathing layer 92. Additionally, for low inductance, stainless steel core 90 preferably should have a vertical-to-horizontal dimension in FIG. 5D exceeding 10:1, and the edges 98a, 98b, 98c and 98d of inner part 80a of insulated ground conductor 80 are preferably radiused such that the radius equals approximately half the vertically shown dimension of core 90 and layers 92 and 94.

Outer part 80b of insulated ground conductor 80 preferably comprises ceramic or terra cotta or other dielectric material having resistance to high temperatures. This is necessary due to high current level through conductor 80 which can, in some extreme cases, cause said ground conductor 80 to heat up due to $I^2R$ heating.

Figure 6A:
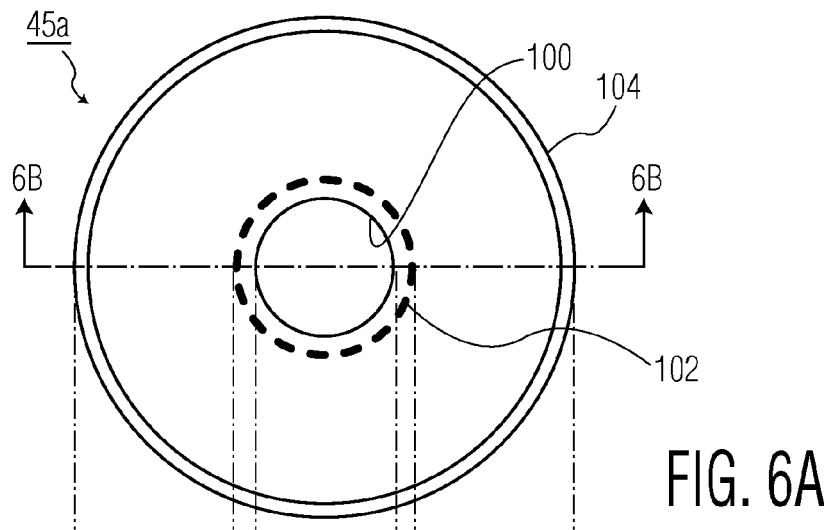
FIGS. 6A and 6B show simplified top plan and associated cross-sectional views of a high-voltage cold-cathode field emissions triode that may be used in the present invention.
Figure 6B:
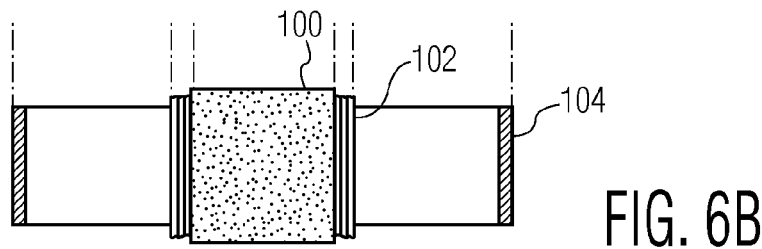

FIGS. 6A and 6B show basic structure of the high-voltage cold-cathode field emission triode 45a (or 45b) of FIG. 2D, also known as a Pulsatron as described in U.S. Pat. No. 4,950,962 by the current inventor and others. However, the Pulsatron is scaled in size to operate in the continuous mode at a desired voltage. Triode 45a includes a cylindrically shaped cathode 100 which is encircled by a cylindrically shaped grid 102, which in turn is encircled by a cylindrically shaped anode 104. Grid 102 is shown as dashed lines to indicate that it would have suitable holes for passage therethrough of electrons. The anode 104, grid 102 and cathode 100 share a common main axis (not shown). The radial spacing from cathode 100 to grid 102 is such as to create therebetween a circular waveguide supporting the transverse electromagnetic mode (TEM). In FIGS. 6A and 6B, the cathode 100 is comprised of a graphite material, the grid 102 is comprised of a conductive metal such as stainless steel, and the anode 104 is comprised of a refractory metal such as tungsten, by way of example.

Figure 6C:
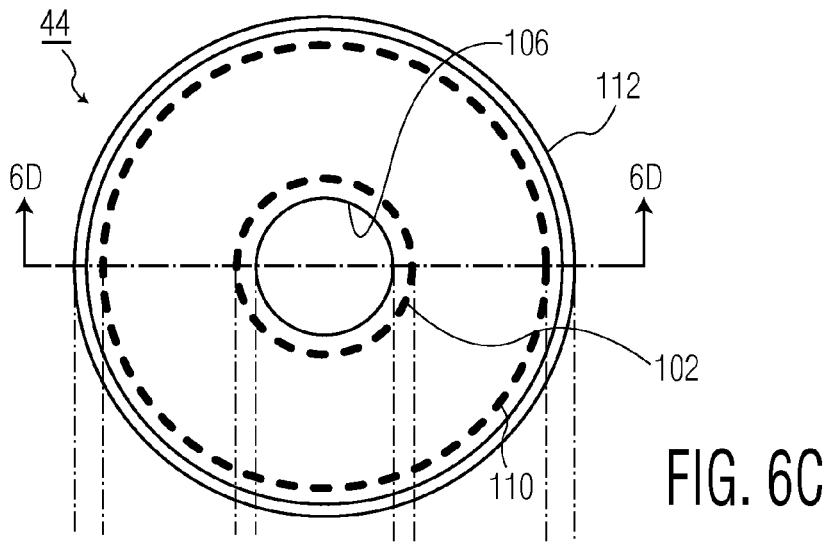
FIGS. 6C and 6D show similar views to FIGS. 6A and 6B, but for a bidirectional high-voltage cold-cathode field-emission electron tube.
Figure 6D:
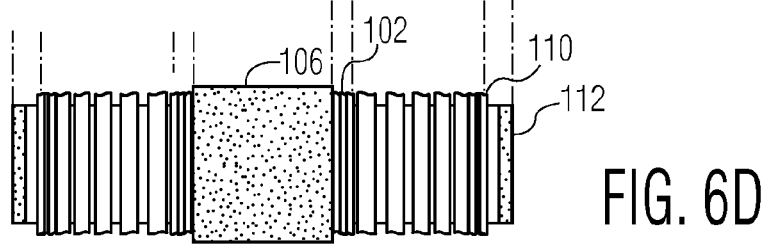

FIGS. 6C and 6D shows basic structure of the high-voltage cold-cathode field emission tube 44 of FIG. 2C, also known as a Bi-tron as mentioned above. Bi-tron 44 includes a cylindrically shaped electrode 106, referred to herein as a cathanode; that is, an electrode that can function as either a cathode or an anode. Encircling cathanode 106 (referred to as first cathanode 132 in FIG. 2C) is a cylindrically shaped first grid 102, which in turn is encircled by a cylindrically shaped second grid 110, which is then encircled by a cylindrically shaped cathanode 112 (referred to as a second cathanode 136 in FIG. 2C). First and second grids 102 and 110 are shown as dashed lines to indicate that they would have suitable holes for passage therethrough of electrons. The cathanodes 106 and 112, and the first and second grids 102 and 110 share a common main axis (not shown). The radial spacing from cathanode 106 to grid 102 is such as to create therebetween a circular waveguide supporting the transverse electromagnetic mode (TEM). Similarly, the radial spacing from cathanode 112 to grid 110 is such as to create therebetween a circular waveguide supporting the transverse electromagnetic mode (TEM). The radial spacing between the first grid 102 and the second grid 110 is sufficient to prevent flashover therebetween at an intended operating voltage. In FIGS. 6C and 6D, the cathanodes 106 and 112 are comprised of a graphite material and the grids 102 and 110 are comprised of a conductive metal such as stainless steel, by way of example.

Both the triode 45a of FIGS. 6A and 6B and the Bi-tron 44 of FIGS. 6C and 6D beneficially can handle current levels of 400 Amps per square centimeter. The speed of each of these switches is preferably enhanced by so-called top-hat sockets described below.

There are several critical conditions that must be met when designing a grid for a cold cathode field-emission electron tube, a Bi-tron or a Pulsatron. They are:

(1) The grid-cathode or grid-cathanode spacing must be constant across the length of the grid. This is usually accomplished by placing the grid under high tension or building it with a rigid structure.

(2) The number of elements in the grid must be high enough to ensure a constant and uniform electric field in the grid-cathode or grid-cathanode region.

(3) There must be no sharp edges of burrs anywhere in the grid structure. Rather, individual elements can be round, flat or high aspect-ratio elliptical shapes. All edges must be fully radiused. In this context, fully radiused means that the edge in question has a radius equal to half the thickness of the material.

The actual implementation of these design rules is determined by the size of the grid being built.

Figure 6E:
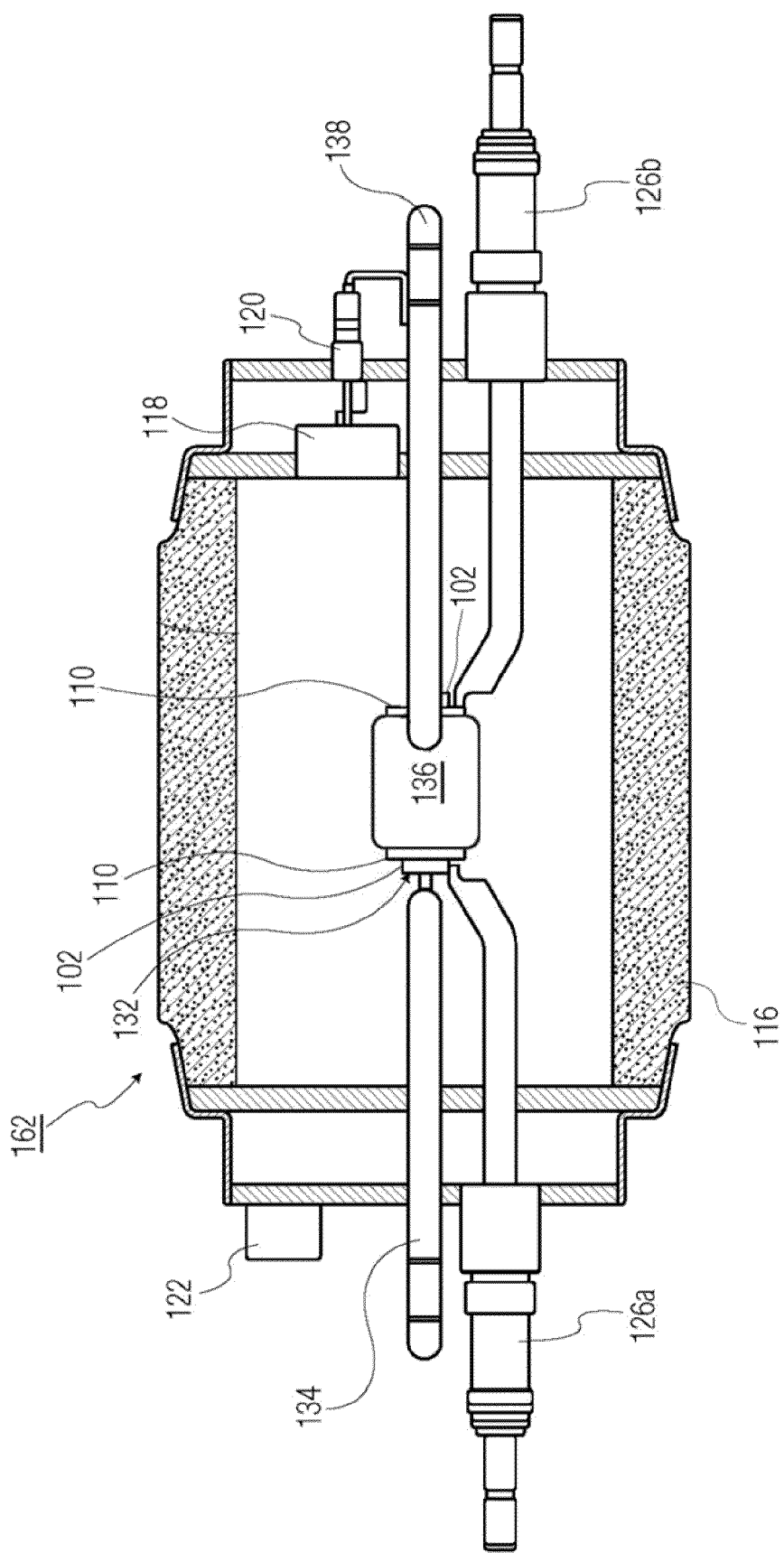
FIG. 6E shows a simplified side plan view, partially in cross section, of a bidirectional high-voltage cold-cathode field-emission electron tube.

FIG. 6E shows a Bi-tron 162, which is a form of bidirectional high-voltage cold-cathode field-emission electron tube. Tube 162 includes an electrically-insulated housing 116, first and second cathanodes 132 and 136 (referred to as 106 and 112 in FIG. 6C) mounted on respective first and second cathanode connectors 134 and 138. First and second grids 102 and 110 are mounted on respective grid feedthroughs 126a and 126b. A chemical getter pump 118 is mounted on getter pump feedthrough 120 and is used to maintain the vacuum in the housing 116 during periods when no electric power is available. A vacuum exhaust tipoff 122 is created at the end of the manufacturing cycle and is used to seal off the housing 116 from the manufacturing equipment. The electron tube 168 shown in FIGS. 6A, 6B, and the electron tube 162 shown in FIGS. 6C, 6D, are designed for a substantially higher operating voltage, and hence have a different aspect ratio, than the electron tube shown in FIG. 6E.

Figure 6F:
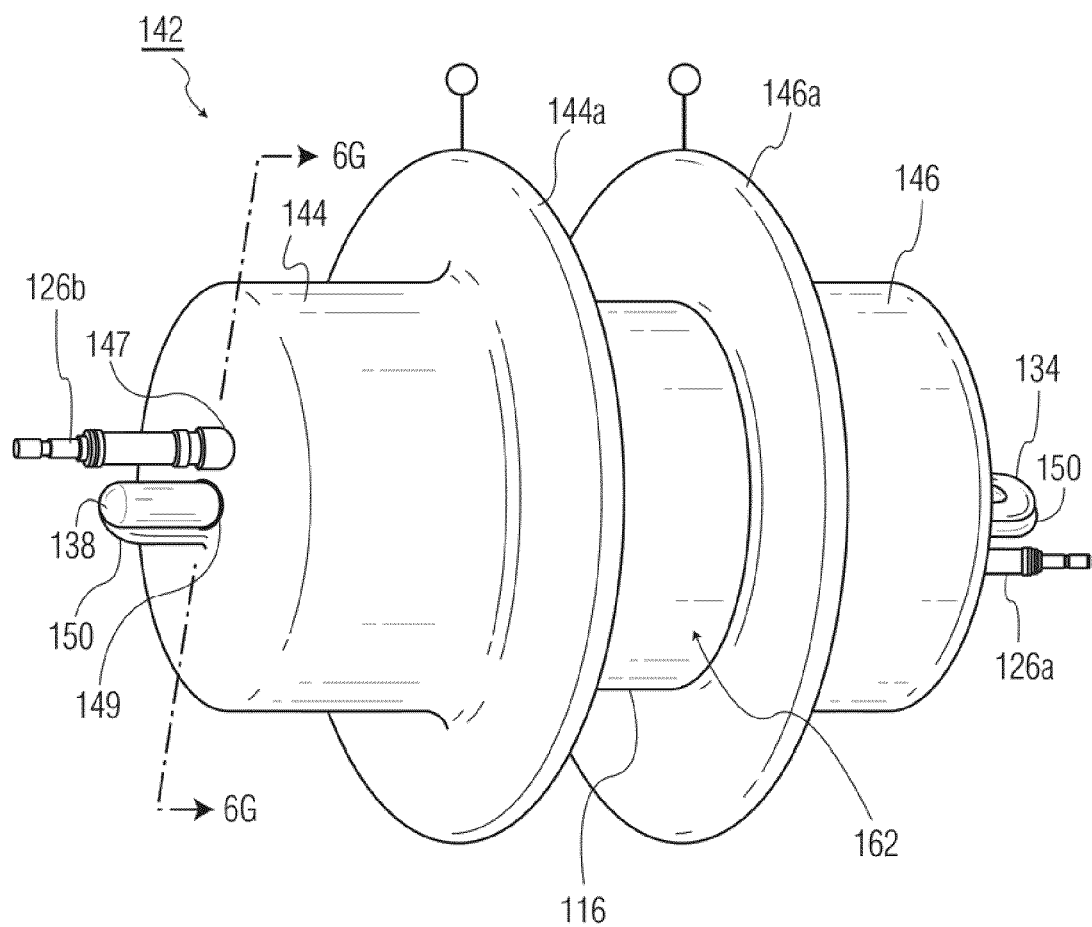
FIG. 6F shows a side perspective view of a reentrant tube holder and ceramic housing for a switch used in the present invention.
Figure 6G:
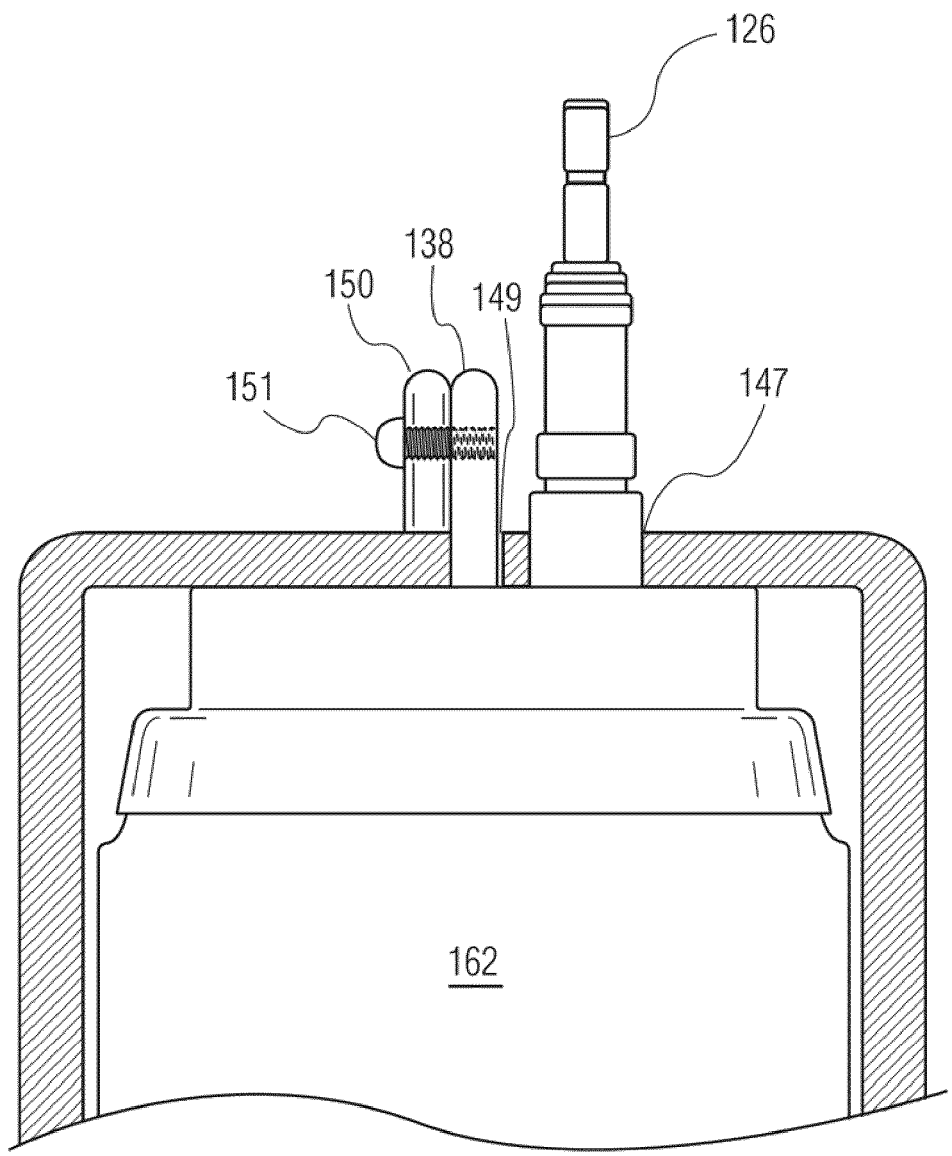
FIG. 6G is a detail view, partially in cross section, taken at arrows 6G, 6G in FIG. 6F of the electrical and mechanical connection of a high voltage cold cathode field-emission tube to the reentrant tube holder of FIG. 6F.

FIG. 6F shows a reentrant tube socket 142, which lowers the inductance of connections to a Bi-tron 162 or a Pulsatron 168 electron tube and reduces risetime of the switch by a factor that may typically be 6:1. This tube socket 142 is primarily designed for use with parallel plate transmission lines, although it can be successfully integrated into other circuit configurations. Reentrant tube socket 142 comprises preferably identical conductive top-hat shaped members 144 and 146 that respectively enclose the two longitudinal ends of the electrically-insulated housing 116 shown in FIG. 6E. Each conductive top-hat shaped member 144 and 146 has a respective rim 144a or 146a for connecting to external circuitry. Electrical connection from circuitry within electrically-insulated housing 116 to members 144 and 146 may be accomplished as shown in FIG. 6G. As that figure illustrates, conductive tab 150 of member 144 interconnects with the cathanode connector 138 by means of a mounting screw 151. Conductive tab 150 is connected to the first or second cathanode connector 134 or 138. The combination of the conductive mounting tab 150 and mounting screw 151 also provide a mechanical interconnection between top hat shaped member 144 or 146 and the electron tube 162 or 168. The conductive mounting tab 150 is preferably welded to the top of the conductive top-hat shaped members 144 and 146. It will be apparent to those skilled in the art that various clearance holes (e.g., 147) and slots (e.g., 149) in the top-hat shaped members 144 and 146 are required to accommodate electrical connections such as grid feedthrough 126 on electron tubes 162 or 168.

Rims 144a and 146a are spaced apart from each other to prevent flashover between them. If desired, an additional insulator 212 (FIG. 10) described below can be placed between the rims, which further lowers the inductance of connections to the switch, thus further decreasing risetime of the switch.

Figure 7:
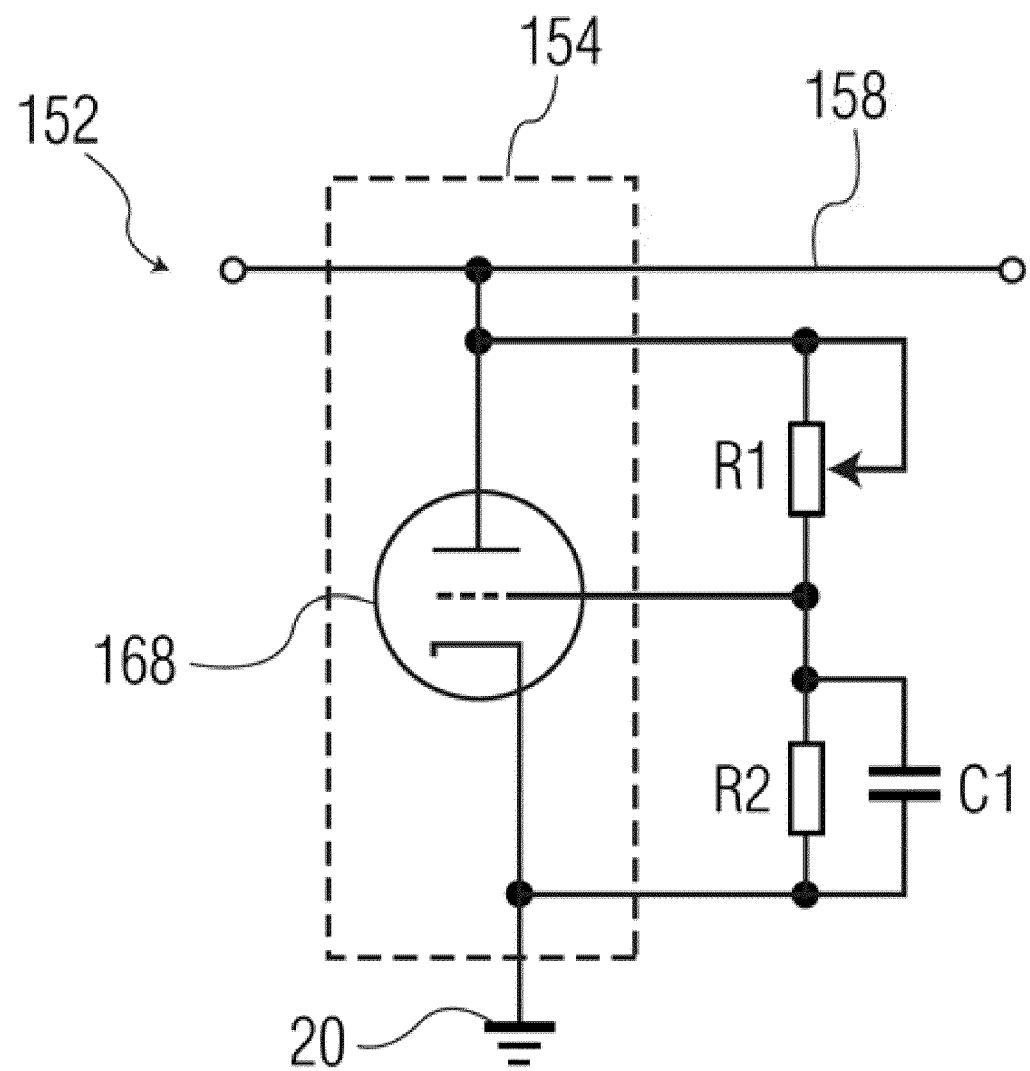
FIG. 7 shows an electrical schematic diagram of a current-diverting path with control circuitry for protection against an NEMP or NNEMP in a conductive path normally at a DC voltage.

FIG. 7 shows a DC threshold detector circuit 152, which implements a current-diverting path 154 with a control circuit for protecting against an NEMP or NNEMP in a conductive path normally at a DC voltage. Path 154 includes a unidirectional switch, comprising a high-voltage cold-cathode field emission triode 168, known as a Pulsatron tube and associated control circuitry. Tube 168 is biased to a standoff condition (i.e., not conducting) at normal line voltage plus an acceptable excess voltage. When the excess voltage value is exceeded, the threshold detector circuit 152 causes the tube 168 to go into conduction so as to create current-diverting path 154.

In particular, in FIG. 7, the tube 168 is biased to shut-off by the network composed of resistors R1 and R2, which form a voltage divider. Resistors R1 and R2 establish a grid voltage that is proportional to the voltage on line. The tube is oriented appropriately to the polarity of the transmission line to which it is attached. The schematic shown is for a negative polarity line. The resistor R1 is a, relatively low value resistor and resistor R2 is a relatively high value resistor. This places the grid close to the cathode potential. This relationship is maintained in all Pulsatron and Bi-tron circuits described below in connection with FIGS. 8A-8B; in regard to these figures, the resistors with an odd reference numeral (i.e., 1, 3 and 5) have lower values relative to their associated resistor in a voltage-divider network with an even reference numeral (i.e., 2, 4 and 6). Further, the resistors with an odd reference numeral preferably are adjustable resistors, as diagrammatically shown. The specific values are dependent on the voltage at which the circuit operates. The capacitor C1 is used to maintain the control voltage if the line voltage goes low for a short period. This is also true for capacitors C2 and C3 in FIGS. 8A-8B.

Referring to FIG. 7, if the voltage on line 158 rises beyond a threshold level, the balance established by the voltage divider R1-R2 network is upset and the tube 168 starts conducting. The threshold level is chosen so that the presence of an NEMP or NNEMP in a conductive path (not shown) including a protected electrical component is detected prior to the pulse reaching and rendering inoperative such electrical component. Accordingly, current-diverting path 154 with tube 168 diverts the NEMP or NNEMP around the protected electrical component with a low inductance, high current capacity circuit relative to the electrical component, before the pulse can reach and render the electrical component Inoperative.

Figure 8A:
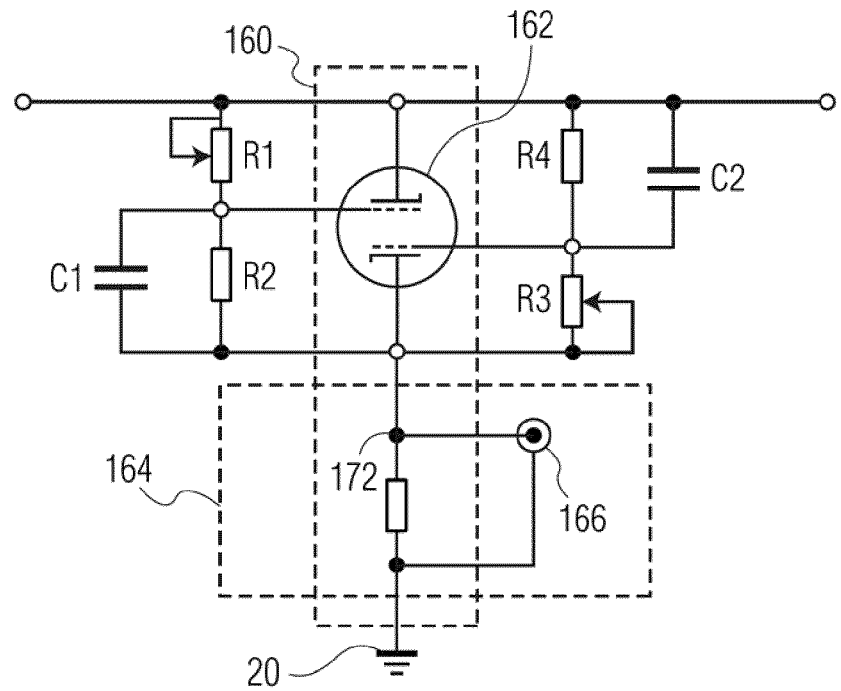
FIG. 8A shows an electrical schematic diagram of a current-diverting path with control circuitry for protection against an NEMP or NNEMP in a conductive path normally at an AC voltage.

FIG. 8A shows a current-diverting path 160 with control circuitry for protection against an NEMP or NNEMP in a conductive path normally at an AC voltage. However, to allow operation in an AC circuit, a bidirectional Bi-tron 162 is used rather than the unidirectional Pulsatron tube 168 of FIG. 7. To accommodate the bi-directional aspect of the circuit, a second voltage divider R3-R4 and capacitor C2 are included. The operation of the detection of NEMP or NNEMP and diverting current away from a protected component as described in connection with FIG. 7 apply to FIG. 8A, except for the duplication of the control network to accommodate AC operation.

FIG. 8A also shows a high-speed current shunt 164 in the ground leg of the circuit. This shunt provides an output when the Bi-tron 162 conducts. This output on node 166 can be used to advise system operators of an EEMP event, or as a means of triggering other protective circuitry.

Figure 8B:
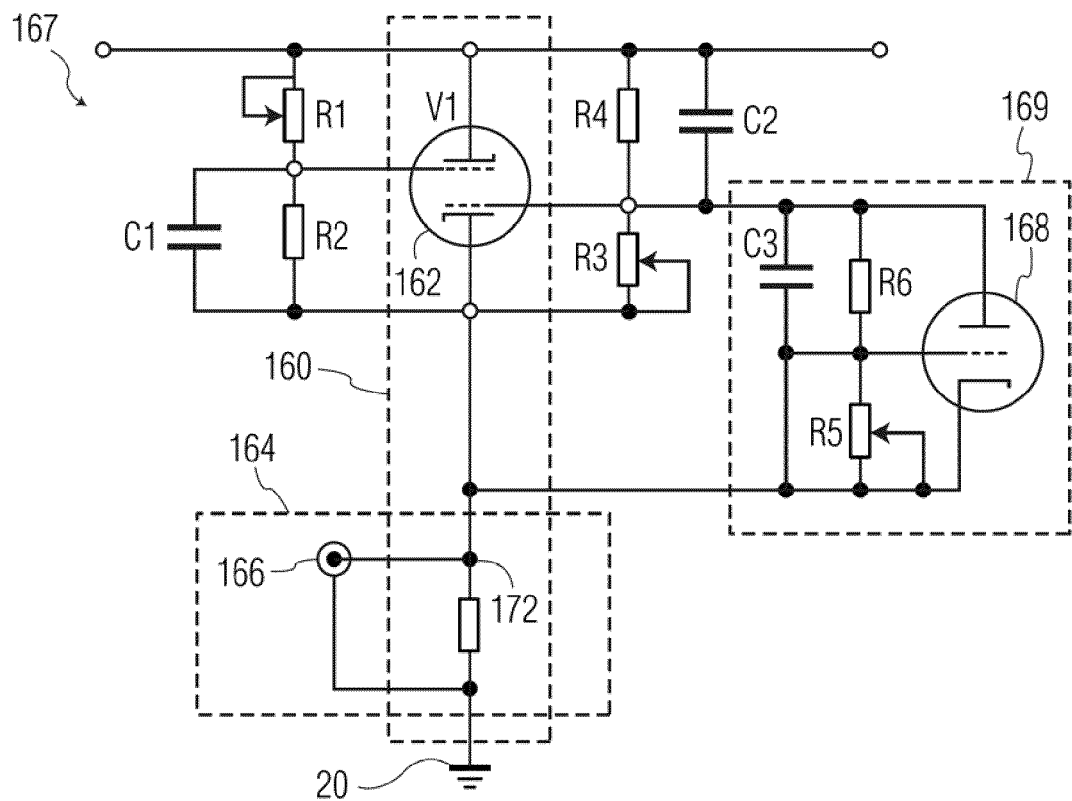
FIG. 8B shows an electrical schematic diagram of a current-diverting path with control circuitry for protection against an NEMP, a NNEMP and a GIC in a conductive path normally at an AC voltage.

FIG. 8B shows a preferred control circuit 167. Circuit 167 is similar to FIG. 8A, but shows a GIC detection circuit 169 for detecting a GIC. The GIC detection circuit 169 comprises voltage-divider network R5-R6 and capacitor C3, together with a Pulsatron 168. When a GIC causes current flow upwardly through the ground path, the current traversing current shunt 164 develops a voltage proportional to the magnitude of the current and its temporal waveform. Such voltage triggers Pulsatron 168 into conduction.

Sequentially turning on Pulsatron 168 and then Bi-tron 162 takes longer than the EMP sensing processes of FIGS. 7 and 8A, so that speed is not as critical due to the slower risetimes of GIC's which are detected with the control circuitry for Pulsatron 168. As with capacitors C1 of FIG. 7 or C1 and C2 of FIG. 8A, capacitor C3 performs a "keep-alive" function.

Figure 8C:
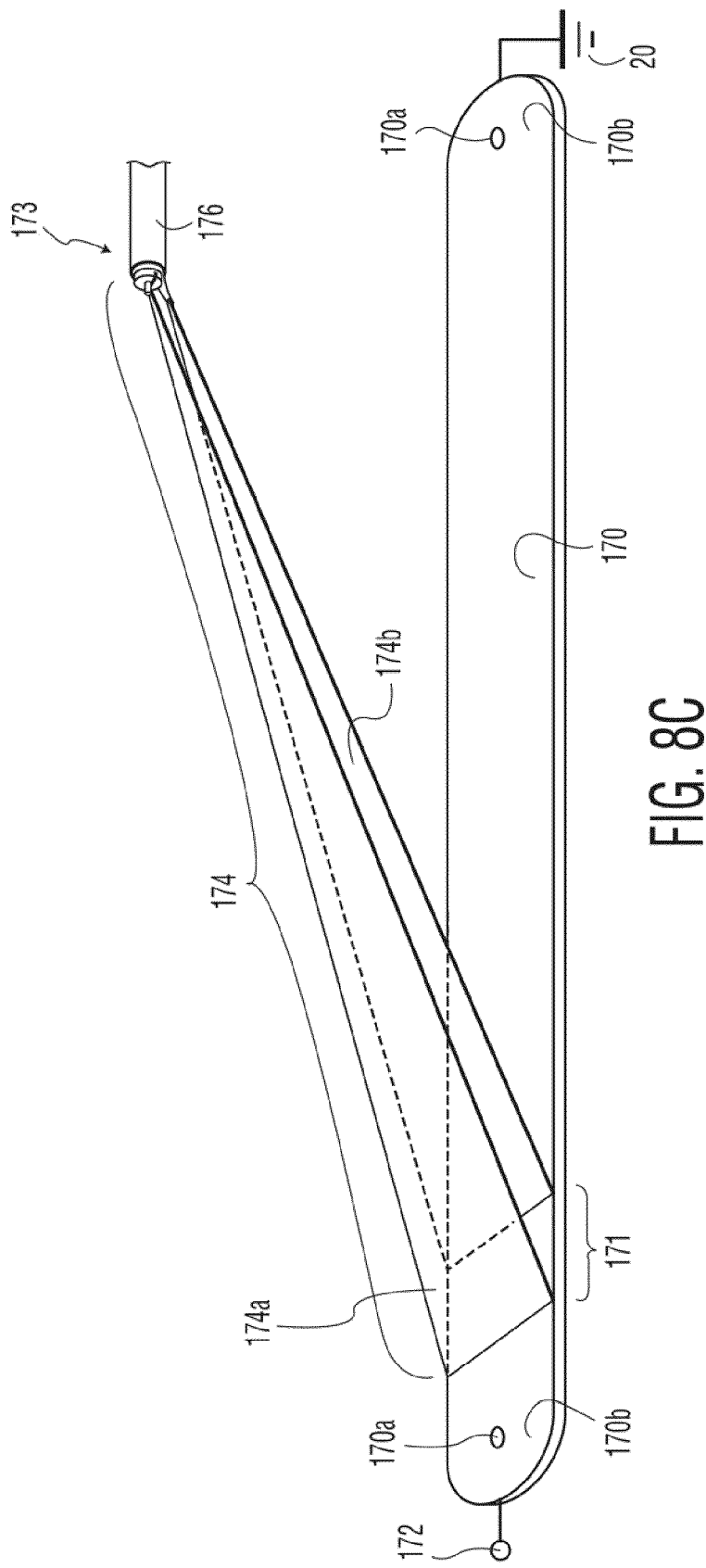
FIG. 8C shows a simplified perspective view of a high speed current shunt with insulation omitted for purpose of clarity of illustration.

Current shunt 164 of FIGS. 8A and 8B is now described in connection with FIGS. 8C-8G. FIG. 8C shows high speed current shunt 164, which is comprised of a flat conductive metal strap 170, with connection holes 170a for connection to a ground path of an external circuit. Metal strap 170 is preferably made of copper or having conductivity at least as low as commercial grade copper. "Commercial grade" connotes copper refined to at least 94 percent copper by mass. Copper strap 170 preferably has fully radiused ends 170b, with holes 170a for respective connections to node 172, also shown in FIGS. 8A and 8B, and earth ground 20. Holes 170a are provided for electrical connection purposes. Preferably, the edges of copper strap 170 are deburred and radiused. Current shunt 164 has the ability to measure pulse currents in excess of 100,000's of Amps.

FIG. 8C also shows a tapered parallel-plate transmission-line matching transformer 174 being preferably silver-soldered to copper strap 170 at the dual ends of a defined current measuring region 171. The narrow ends of plates 174a and 174b in transmission line 174 are preferably silver-soldered to an end 173 of a 50-ohm coaxial cable 176. Coaxial cable 176 must be at least about ½-inch (12.77 mm) in diameter to handle the high voltage that results from large amounts of current across the measuring region 171. Increasing amounts of currents force the use of progressively larger diameter coaxial cable to handle the increased voltage produced by the measuring region 171 of the shunt 164. The width of each of plates 174a and 174b at their connection junctures to metal strap 170 is preferably approximately the same, although these widths may vary from about 0.9 to 1.1 times the width of the strap 170.

The ratio of the length of upper plate 174a to the width of the flat metal strap 170 preferably is approximately 10 to 1. Lower ratios lead to increasing impedance mismatch. Having a ratio substantially larger than 10 to 1 leads to an overly large and ungainly structure. Further, plates 174a and 174b can have various tapers from their narrow ends to their wide ends. For example, the simplest taper is a straight line so that the plates approximate equilateral triangles. A preferred taper is more complex so as to have exponentially varying sides to the foregoing equilateral triangle, approximating the curve of the bell (or output orifice) of a musical trombone.

Figure 8D:
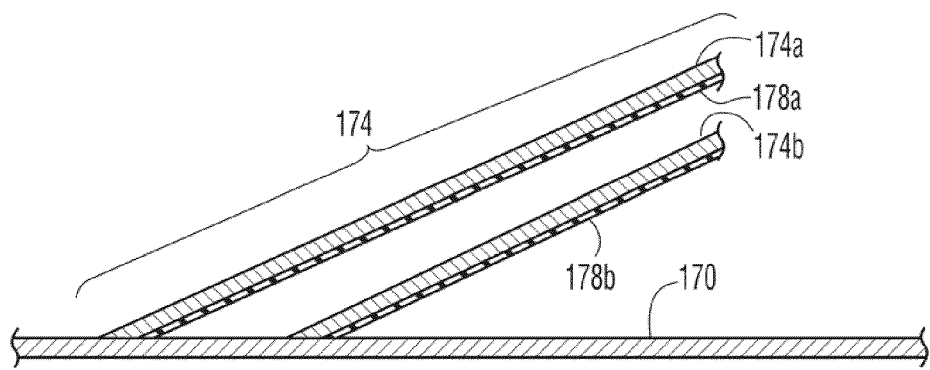
FIG. 8D shows an enlarged side plan view of a conductive metal strap and tapered plates with insulation.

FIG. 8D shows a side view of copper strap 170, upper and lower plates 174a and 174b of transmission line 174, and insulation 178a and 178b. Such insulation 178a and 178b are omitted from FIG. 8C for clarity of illustration. Insulation 178a extends the entire length under first plate 174a, from the juncture of the copper strap 170 and the wide end of upper plate 174a to an end in slot 188 in the center insulation 177 (FIG. 8E) of a coaxial cable 176. Slot 188 (FIG. 8E) serves the function of eliminating a line-of-sight path for electrons to prevent a short circuit from forming between center conductor 182 and coaxial shield 186. Insulation 178b preferably extends a minimum of one-half the length of lower plate 174b under such plate from the Juncture of the copper strap 170 and the wide end of lower plate 174b.

Figure 8E:
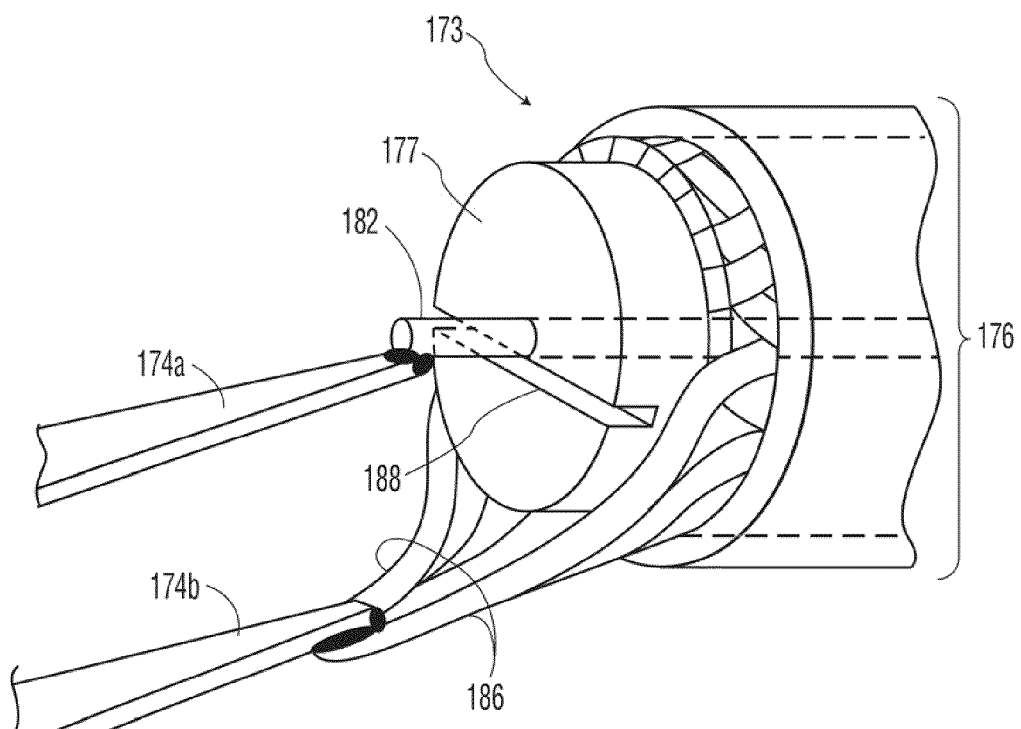
FIG. 8E shows an enlarged perspective view of plates of a transmission line as joined to a coaxial cable.

FIG. 8E shows the tapered parallel-plate transmission line 174 connected to coaxial cable 176. As shown in that figure, the center conductor 182 of the coaxial cable 176 is soldered (as shown by a solid black region) to the upper side of the upper plate 174a. Similarly, coaxial cable shield 186, shown with an enlarged view of braids of wires forming the shield, is soldered (as shown by a solid black region) to the underside of lower plate 174b. Preferably, the foregoing solder connections are made using silver solder with a silver content exceeding approximately 5 percent by mass.

Figure 8F:
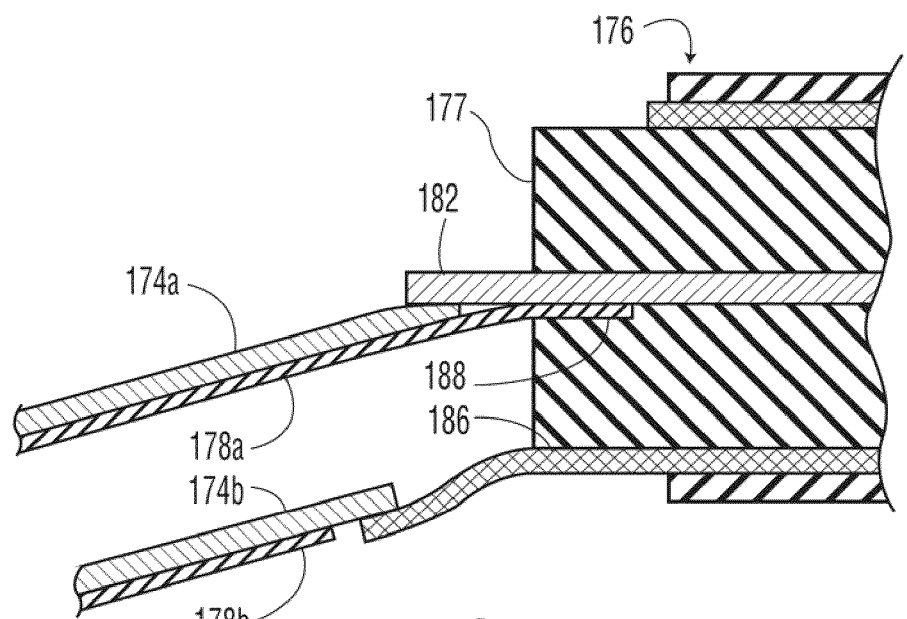
FIG. 8F shows an enlarged side plan view, partially in cross section, of electrical connections and insulation shown in FIG. 8E.

FIG. 8F shows transmission line 174 with upper plate 174a preferably silver-soldered to center conductor 182 and lower plate 174b preferably silver-soldered to shield 186 of coaxial cable 176. As mentioned above, insulation 178a is inserted into slot 188 in center insulation 177 of cable 176.

Figure 8G:
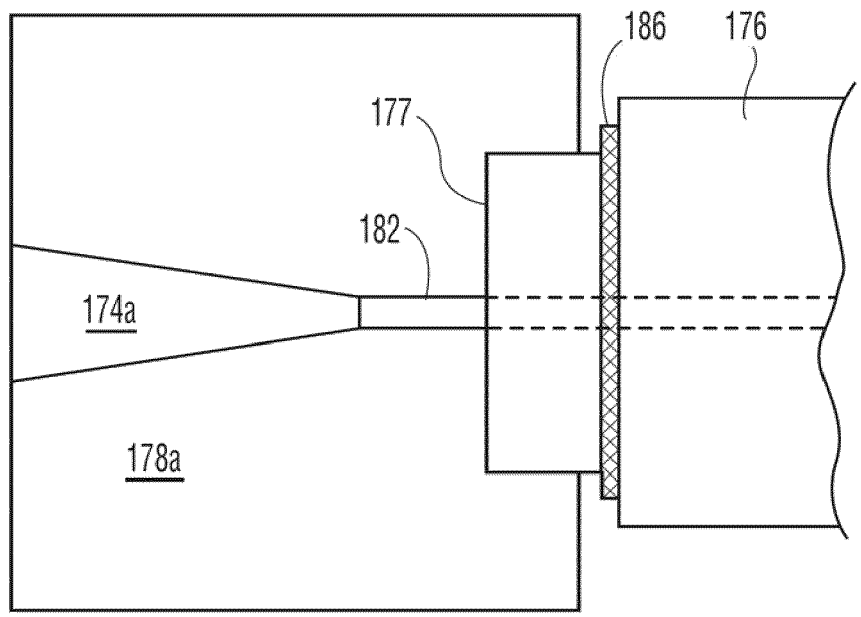
FIG. 8G shows an enlarged top plan view of one of the interconnections and associated insulation shown in FIG. 8E.

FIG. 8G shows first plate 174a silver-soldered to center conductor 182 in cable 176. Insulation 178a can be seen protruding from under first plate 174a.

The foregoing current shunt 164 of FIGS. 8C-8G can be arranged with the upper and lower plates 174a and 174b functionally interchanged. To visualize this, in the foregoing discussion, the upper plate 174a was the "hot" conductor and the lower plate 174b was the "ground" conductor. In the alternative version, these functions are interchanged so that the upper plate becomes the ground conductor and is attached to the shield 186 of coaxial cable 176, and the lower plate becomes the hot conductor and is attached to the center conductor 182 of coaxial cable 176. In this configuration, the insulation 178b is now inserted into slot 188 of coaxial cable 176.

As is well known in the art, high frequency electricity travels at the skin of a conductor in a process known as the skin effect. The skin effect cannot be ignored in direct measurements of high-speed pulse currents, and a mathematical compensation is required to extract an exact measurement of the current. A current shunt converts current into voltage as a function of voltage drop across a current-measuring region. Attention must be paid to proper impedance matching of the current-measuring region to the measuring instrument. The foregoing concern is addressed by the incorporation of the above-described tapered parallel-plate transmission-line matching transformer.

The current shunt output must be corrected for high frequency operation due to the skin effect on resistance. The formula for skin depth correction (and therefore Impedance as a function of frequency) of a rectangular cross-section shunt is well known and, as applied to the present current shunt, is as follows:

$$Z = \frac{l_{th}}{2(w+t)} \sqrt{\frac{\pi f \mu}{\sigma}}$$

where:
Z=impedance of current-measuring region 171
$l_{th}$=length of current-measuring region 171
w=width of conductive strap 170 t=thickness of conductive strap 170
f=frequency (risetime)
μ=permeability (H/m) of conductive strap 171
σ=conductivity (1/Ω-m) of conductive strap 171

Note: For a copper shunt operating in air, the permeability is taken as 1.

Ohm's Law is applied (Voltage/Resistance=Current using the Z value for Resistance) to determine the current. It is, of course, necessary to convert risetime to frequency by the established method.

Figure 9:
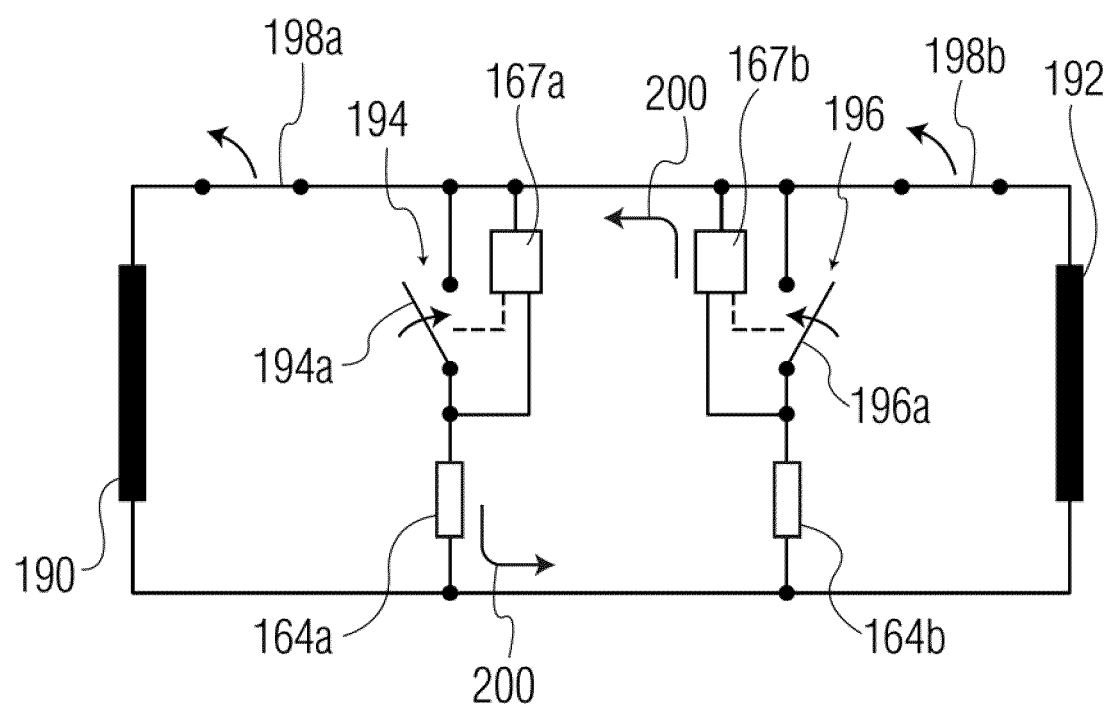
FIG. 9 shows an electrical circuit diagram of some components of a power transmission system and associated current-diverting paths.

FIG. 9 shows a pair of protected electrical components 190 and 192 with associated current-diverting paths 194 and 196 including protective devices 194a and 196a and preferably a pair of normally-closed series switches 198a and 198b. Components 190 and 192 may be windings of a transformer or an electrical generator, by way of example. The protective devices 194a and 196a in current-diverting paths 194 and 196 are examples of protective device 37 of FIG. 2B. Normally-open switches in protective devices 194a and 196a close upon detection of an EEMP event. NEMP and NNEMP events are detected as voltages preferably by control circuit 167a and 167b (see 167 in FIG. 8B), and GIC events are detected as currents by current shunts 164a and 164b operating in conjunction with control circuits 167a and 167b as shown in FIG. 9.

Upon receipt of suitable voltage or current inputs, control circuit 167a outputs a control signal to activate normally-closed switch 198a. Similarly, upon receipt of suitable voltage or current inputs, control circuit 167b outputs a control signal to activate normally-closed switch 198b. The closing of the normally-open switches in response to control signals from control circuits 167a and 167b cause devices 194a and 196a to collapse the magnetic field in windings 190 and 192, and create current-diverting paths 194 and 196, respectively. The switches in the protective devices 194a and 196a also produce an output that is used to trigger the opening of normally-closed switches 198a and 198b after a predetermined time after detection of an EEMP of no more than two cycles of the line voltage. This is for the purpose of removing a short circuit from protected component 190. Arrows 200 show the circulating path of current produced by the EEMP event in the current-diverting paths 194 and 196. The direction of the foregoing current depends on instantaneous polarity of the circuit at the time of the EEMP event, and may or may be in the direction of the arrowheads as shown. The normally-closed switches 198a and 198b of FIG. 9 may be any type of switch with suitable voltage, current, and response-time ratings, which would include a Bi-tron 44 or 162 (FIG. 2C or FIG. 6E).

Figure 10:
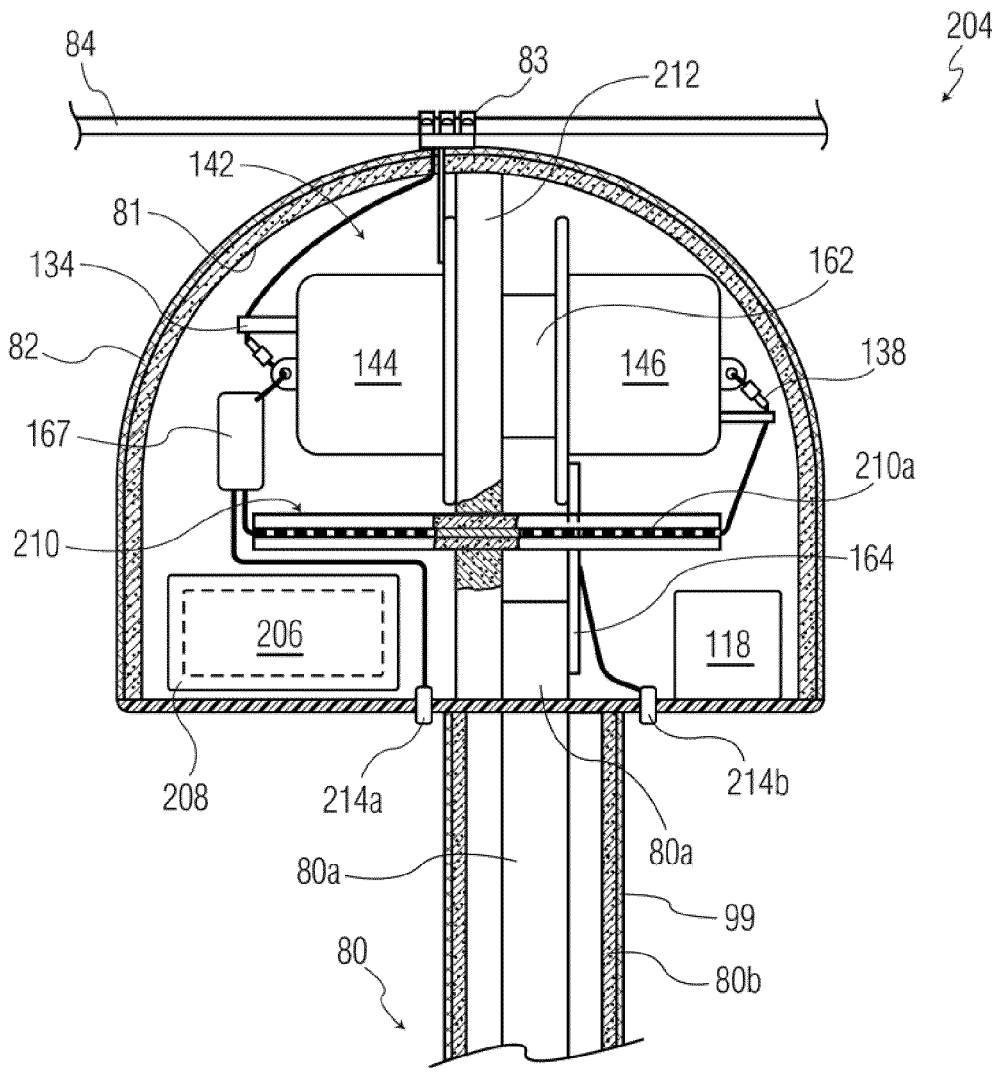
FIG. 10 shows a side plan view of a complete current-detection and current-diversion apparatus for a wye-connected electrical component.

FIG. 10 shows a complete EEMP protection device 204, which is the preferred embodiment of the FIG. 8B electrical schematic for wye-connected electrical components. The device 204 has two types of internal vacuum pumps. One is a chemical getter pump 118. This is always functional. The second is an ion pump 206 of conventional design but of open construction for maximum conductivity. There is an internal magnetic shielding 208 to preclude interference with the electron trajectories in the adjacent switch tube 162 of FIG. 10 or switch tube 168 (not shown). While the ion pump 206 requires a small amount of electricity to operate, it is critical to ensure that the vacuum is properly maintained at all times in the enclosure. The chemical getter pump 118 maintains the vacuum when electricity is not available, such as during shipping, installation, maintenance or blackouts.

Contained within vacuum housing 81 is the switch tube 162 or 168 mounted inside the reentrant tube socket 142. Top-hat shaped sockets 144 and 146 are separated by an insulator wall 212. This wall 212 serves the dual purpose of providing additional electrical insulation between the two sockets 144 and 146 and simultaneously provides a mechanical mounting means for the tube 162 or 168 and reentrant tube socket 142. The preferred control circuit 167 is connected to the electrodes of tubes 162 and 168. One of the electrical connection leads, 210a, runs through an insulated feedthrough tube 210 to allow an insulated electrical connection to electrodes of switch tube 162 or 168 on the other side of insulated wall 212.

With regard to the switch tube 162 or 168, one embodiment includes the concept of not having such tubes 162 or 168 in individual vacuum housings, such as housing 116 (FIG. 6E). Instead, the tubes are constructed in open housings and use the vacuum system 206 instead to maintain the vacuum necessary for their operation.

The insulated ground conductor 80 previously described in FIG. 5D has one end terminated inside the housing 81. The ground conductor 80 may serve two functions: when used with an electrical component with windings in a wye configuration, it provides mechanical support for the EEMP protection device 204 by supporting the entire weight of said system, and it simultaneously provides a low-inductance path to ground 20 to allow completion of the current-diverting path during operation. The ground connection means is connected to the balance of the circuitry via the current shunt 164 (FIGS. 8C-8G).

Figure 11:
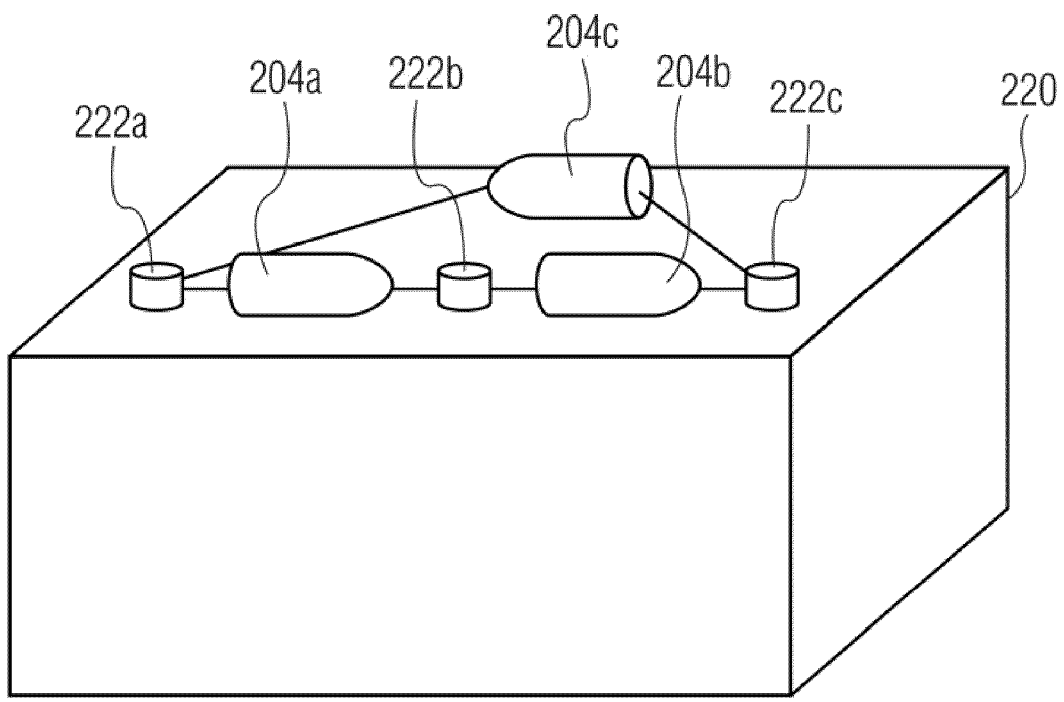
FIG. 11 shows a simplified perspective view of the interconnections of current-diverting elements to a delta-connected electrical component.

There are two methods of connecting the EEMP protection device 204 for use. They relate to the following two standard wiring schemes for three-phase circuitry: wye 60 of FIG. 4A and delta 68 of FIG. 4B. These figures show the respective wiring methods and have been previously described. FIG. 11 shows one set of connections of a delta-configured transformer 220. The terminations for the windings of the transformer 220 are presented as bushings 222a, 222b, and 222c. Three EEMP protection devices 204 are positioned side by side and are wired to place each device 204 between a respective pair of terminals constituting a single phase of the transformer 220 winding. Thus, device 204a is connected to bushings 222a and 222b, device 204b is connected to bushings 222b and 222c, and device 204c is connected to bushings 222c and 222a as shown in FIG. 11. This corresponds to the transformer winding configuration 68 of FIG. 4B.

For protection of a power system, it is necessary to protect the primary and secondary of every transformer of that system with an EMP protective device 204 installed physically adjacent to the transformer on each phase connection. It is further necessary to similarly protect generators of the power system with EMP protective devices on each phase connection installed physically adjacent to the generator itself. For economic or other reasons, EMP protective devices may be used with fewer than all transformers and generators of a power system.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. A high-speed current shunt, comprising:
  a) a flat conductive metal strap having a first and a second electrode at each end of said strap for connection to an external circuit for receiving current through the strap;

said strap having a defined current-measuring region extending from a first linear position to a second linear position along the length of the strap; and b) a tapered parallel-plate transmission-line impedance-matching transformer, comprising:

i) first and second plates tapered in shape and having a wide end and a narrow end, relative to one another; each tapered plate having a length approximately 10 times that of width of said metal strap;

ii) said first plate being attached at its wide end to said first linear position of the defined measuring region by a solder and said second plate being attached at its wide end to said second linear position of the defined measuring region by a solder; and iii) a coaxial cable with a center conductor being attached by a solder to the narrow end of the first plate, and a shield being attached by a solder to the narrow end of the second plate.

2. The shunt of claim 1, wherein said solders have a conductivity at least as high as that of silver solder with a silver content exceeding 5 percent by mass.

3. The shunt of claim 1, wherein the conductive metal strap has a conductivity at least as high as that of commercial grade copper with a copper content of at least 94 percent by mass.

4. The shunt of claim 1, further comprising a first electrical insulation under said first plate extending from a juncture of said strap and said wide end of the first plate to beyond said narrow end of the first plate and into a slot extending along a longitudinal length under and approximately parallel to the center conductor of the coaxial cable.

5. The shunt of claim 1, further comprising a second electrical insulation under said second plate extending from a juncture of said strap and said wide end of the second plate in the direction towards the coaxial cable, not less than one-half of the length of the second plate.

6. The shunt of claim 1, wherein the width of each of the tapered plates is approximately equal to the width of the flat metal strap.

7. The shunt of claim 1, wherein the impedance of the coaxial cable is 50-ohms.

8. The shunt of claim 1, wherein the diameter of the coaxial cable is at least 12.77 mm.

* * * * *